US011062128B2

(12) United States Patent
Mehrseresht

(10) Patent No.: US 11,062,128 B2
(45) Date of Patent: Jul. 13, 2021

(54) INTERACTION CLASSIFICATION USING THE ROLE OF PEOPLE INTERACTING OVER TIME

(71) Applicant: CANON KABUSHIKI KAISHA, Tokyo (JP)

(72) Inventor: Nagita Mehrseresht, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 15/612,991

(22) Filed: Jun. 2, 2017

(65) Prior Publication Data

US 2018/0349704 A1 Dec. 6, 2018

(51) Int. Cl.
*G06K 9/00* (2006.01)
*G06K 9/62* (2006.01)

(52) U.S. Cl.
CPC ..... *G06K 9/00335* (2013.01); *G06K 9/00771* (2013.01); *G06K 9/6297* (2013.01)

(58) Field of Classification Search
CPC ............. G06K 9/00744; G06K 9/6268; G06K 9/00362; G06K 2009/00738
See application file for complete search history.

(56) References Cited

U.S. PATENT DOCUMENTS

| 7,921,036 B1 * | 4/2011 | Sharma | G06Q 20/3674 |
| | | | 705/14.49 |
| 9,489,042 B2 * | 11/2016 | Craig | G06F 3/017 |
| 9,501,723 B2 | 11/2016 | Kim | |
| 9,554,081 B2 * | 1/2017 | Hanckmann | H04N 5/91 |
| 9,846,845 B2 * | 12/2017 | Sigal | G06N 99/005 |
| 9,940,508 B2 * | 4/2018 | Kaps | A63F 13/00 |
| 2014/0270482 A1 * | 9/2014 | Chakraborty | G06K 9/00221 |
| | | | 382/154 |
| 2014/0270707 A1 * | 9/2014 | Fathi | G11B 27/031 |
| | | | 386/278 |

(Continued)

FOREIGN PATENT DOCUMENTS

| AU | 2013280203 A1 | 7/2015 |
| AU | 2014218444 A1 | 3/2016 |

(Continued)

OTHER PUBLICATIONS

Laureano-Cruces et al.( "A reactive behavior agent: Including emotions into a video game." Journal of applied research and technology 10.5 (2012): 651-672). (Year: 2012).*

(Continued)

*Primary Examiner* — Pinalben Patel
(74) *Attorney, Agent, or Firm* — Canon U.S.A., Inc. IP Division

(57) ABSTRACT

A method of classifying an interaction captured in a sequence of video. A plurality of people in the video sequence is identified. An action of a first one of the people at a first time is determined. An action of a second one of the people at a second time is determined, the action of the second person being after the action of the first person. A role for the second person at the second time is determined, the role being independent of the determined actions of the first and second person. An interaction between the first person and the second person is classified based on the determined role of the second person and the determined actions of the first and second person.

17 Claims, 17 Drawing Sheets

(56) References Cited

U.S. PATENT DOCUMENTS

| | | |
|---|---|---|
| 2016/0063358 A1 | 3/2016 | Mehrseresht |
| 2016/0322078 A1* | 11/2016 | Bose .................. A63B 71/06 |
| 2017/0024635 A1 | 1/2017 | Drake et al. |
| 2017/0032246 A1 | 2/2017 | Knittel et al. |
| 2017/0075887 A1 | 3/2017 | Drake et al. |
| 2018/0082717 A1* | 3/2018 | Bose .................. H04N 5/23229 |
| 2019/0057356 A1* | 2/2019 | Larsen ............... G06K 9/00744 |
| 2019/0294881 A1* | 9/2019 | Polak .................. G06K 9/4628 |
| 2019/0304157 A1* | 10/2019 | Amer .................. G06N 3/0454 |

FOREIGN PATENT DOCUMENTS

| | | | |
|---|---|---|---|
| AU | 2014277847 A1 | 7/2016 | |
| AU | 2014280961 A1 | 7/2016 | |
| AU | 2015205874 A1 | 2/2017 | |
| AU | 2015207945 A1 | 2/2017 | |
| AU | 2015271975 A1 | 7/2017 | |
| AU | 2016277542 A1 | 7/2018 | |
| DE | 102014106210 B4 * | 12/2015 | ............. H04N 7/181 |

OTHER PUBLICATIONS

Kim, Dae Ha, et al. "Real-time purchase behavior recognition system based on deep learning-based object detection and tracking for an unmanned product cabinet." Expert Systems with Applications 143 (2020): 113063. (Year: 2020).*

U.S. Appl. No. 15/265,653, filed Sep. 14, 2016 to Nagita Mehrseresht.

U.S. Appl. No. 15/385,291, filed Dec. 20, 2016 to Nagita Mehrseresht.

Lan, et al., "Social roles in hierarchical models for human activity recognition", in Proc. Computer Vision and Pattern Recognition, USA, 2012, pp. 1354-1361.

Ramanathan, et al., "Social role discovery in human events", In Proceedings of the IEEE Conference on Computer Vision and Pattern Recognition, pp. 2475-2482. 2013.

Shu, et al., "Joint inference of groups, events and human roles in aerial videos", In Proceedings of the IEEE Conference on Computer Vision and Pattern Recognition, pp. 4576-4584. 2015.

Kwak, et al., "Multi-agent Event Detection: Localization and Role Assignment", The IEEE Conference on Computer Vision and Pattern Recognition (CVPR), 2013, pp. 2682-2689.

* cited by examiner

INTERACTION CLASSIFICATION USING THE ROLE OF PEOPLE INTERACTING OVER TIME

TECHNICAL FIELD

The present invention relates to recognising interactions in a video sequence using visual features, social roles and position information. The present invention also relates to a method, apparatus and system for classifying interactions over time using actions and roles of people. The present disclosure also relates to a computer program product including a computer readable medium having recorded thereon a computer program for classifying interactions in a video sequence using actions and social roles.

BACKGROUND

Human activity recognition becomes increasingly important in a wide range of video surveillance, sport analysis, and video digest generation applications. For example, detecting suspicious human activities in surveillance videos has the potential to predict terrorist attacks and other potential threats to human safety.

One known action recognition method trains a classifier for an action of interest based on visual features, using a given training set containing samples of the action of interest. The trained classifier is then applied to a fixed length, and often overlapping, temporal segment of a new (unseen) video sequence and the action of interest is recognised by processing classification scores.

One known interaction classification method applies a single time slice model, in modelling interaction of field hockey players, by taking into account social role information for the players. However, the modelling is incapable of describing interactions that occur over an extended time interval.

There is a need for an improved and more accurate interaction classification method.

SUMMARY

It is an object of the present invention to substantially overcome, or at least ameliorate, one or more disadvantages of existing arrangements.

According to one aspect of the present disclosure, there is provided a method of classifying an interaction captured in a sequence of video, the method comprising:
identifying a plurality of people in the video sequence;
determining an action of a first one of the people at a first time;
determining an action of a second one of the people at a second time, the action of the second person being after the action of the first person;
determining a role for the second person at the second time, the role being independent of the determined actions of the first and second person; and
classifying an interaction between the first person and the second person based on the determined role of the second person and the determined actions of the first and second person.

According to another aspect of the present disclosure, there is provided an apparatus for classifying an interaction captured in a sequence of video, the apparatus comprising:
means for identifying a plurality of people in the video sequence;
means for determining an action of a first one of the people at a first time;
means for determining an action of a second one of the people at a second time, the action of the second person being after the action of the first person;
means for determining a role for the second person at the second time, the role being independent of the determined actions of the first and second person; and
means for classifying an interaction between the first person and the second person based on the determined role of the second person and the determined actions of the first and second person.

According to another aspect of the present disclosure, there is provided a system for classifying an interaction captured in a sequence of video, the system comprising:
a memory for storing data and a computer program;
a processor coupled to the memory for executing the computer program, the program comprising instructions for:
identifying a plurality of people in the video sequence;
determining an action of a first one of the people at a first time;
determining an action of a second one of the people at a second time, the action of the second person being after the action of the first person;
determining a role for the second person at the second time, the role being independent of the determined actions of the first and second person; and
classifying an interaction between the first person and the second person based on the determined role of the second person and the determined actions of the first and second person.

According to another aspect of the present disclosure, there is provided a computer readable medium having a computer program stored thereon for classifying an interaction captured in a sequence of video, the program comprising:
code for identifying a plurality of people in the video sequence;
code for determining an action of a first one of the people at a first time;
code for determining an action of a second one of the people at a second time, the action of the second person being after the action of the first person;
code for determining a role for the second person at the second time, the role being independent of the determined actions of the first and second person; and
code for classifying an interaction between the first person and the second person based on the determined role of the second person and the determined actions of the first and second person.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
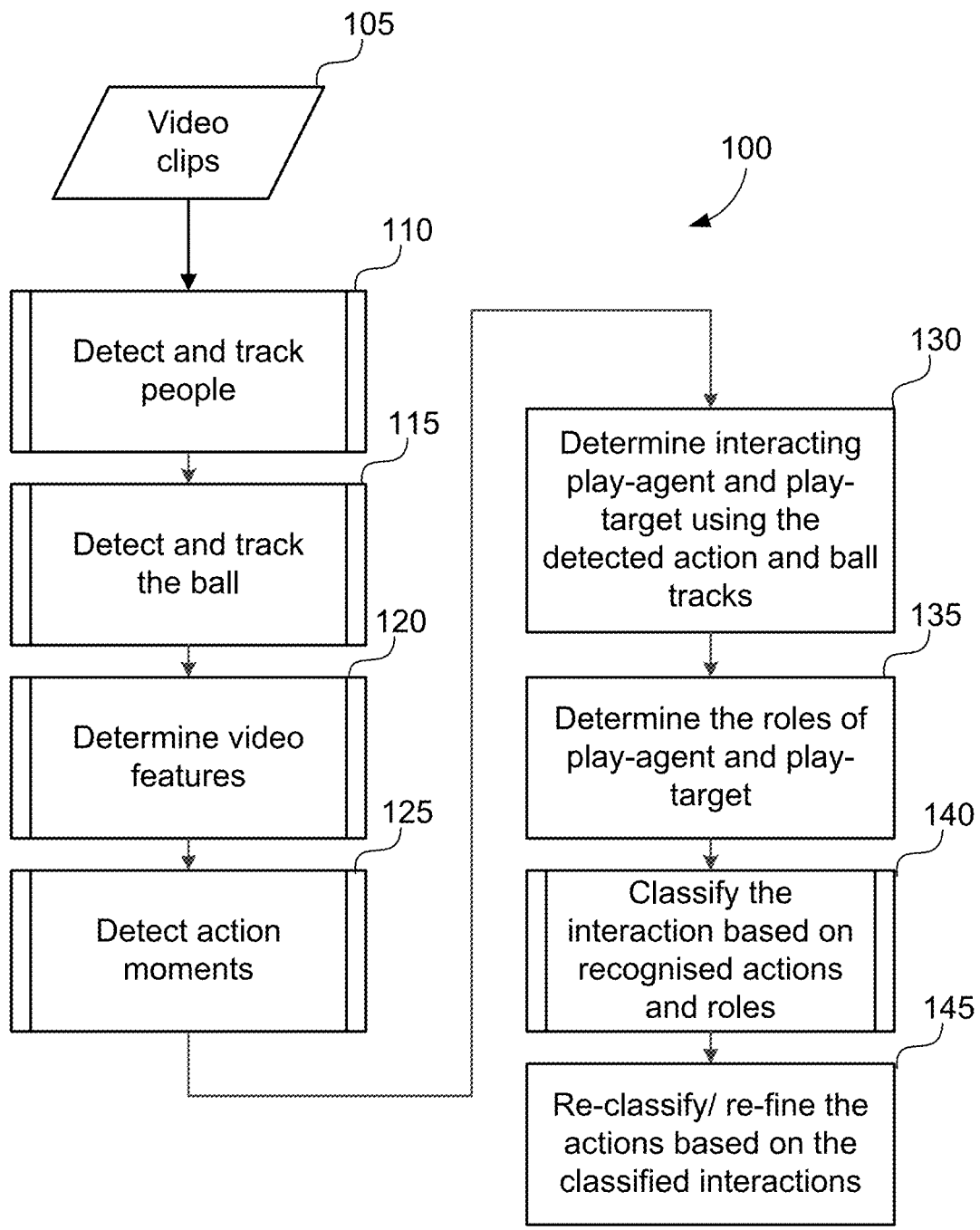
FIG. 1 is a schematic flow diagram showing a method of classifying interactions.

A video sequence is a recording of an event or scene as a set of images with temporal ordering. The term video segment may be used to refer to the whole or part of a video sequence. The images forming a video sequence are called 'frames.' The frames in a video segment are temporally consecutive. The order of frames in a video sequence is called frame number. The frame number may be used to refer to the relative timing of an action or event in a video sequence. The term action refers to the act of doing something at a particular timestamp in order to make something happen, and an action involves only one person. For example, a "kicking" action occurs at the moment when a ball is kicked by a soccer player. An action which happens after another action is associated with a later time (i.e., a succeeding frame number).

Video analysis, a commonly used technique in modern sports, has many applications. Video analysis may be used to improve the performance of teams and individuals. Coaches can analyse video sequences of live action to provide helpful feedback for teams. Athletes can also improve their strengths using video analysis. Video analysis may be used by an athlete to discover weakness that may be holding him/her back. For example, a basketball player may be weak in defense. Once the weakness is identified, the athlete can work on the identified weakness and improve their performance.

Video analysis also helps athletes in preventing injuries, which is an important part of every sport. For example, video analysis may be used by an athlete to study his/her own technique and pinpoint areas that must be changed in order to avoid injuries. The feedback from video analysis may also help injury rehabilitation.

Quite often a video analysis system requires input from a human evaluator/annotator (e.g., a scout). Specifically, a human evaluator (e.g., a scout) may mark a video (either in real-time or after the game) with chosen moments such as goals, errors, and specific plays. The moments may also include potentially lost or created opportunities by each player. The system can then allow the user to filter and watch their desired aspects of the game, such as all goals by a specific player, or attacks by a specific team. Game highlights may also be generated using the annotations. However, manual inspection of the videos is expensive. The time for manually annotating the video is often proportional to the length of the game. The growing volumes of sport videos also add to the difficulty. Further, manual inspection may degrade due to fatigue caused by long analysis time, and different scouts may use different guidelines in their annotations. There is therefore a need for automated video analysis. Action recognition may be used for classification of interactions amongst people captured within a video sequence. An interaction is an activity of two players occurring over a period of time. Each agent in a group of interacting agents (e.g., a group of people) may be referred to as a person. The term person may also refer a living creature or an automated robot. An interaction comprises a pair of spatio-temporally interacting actions. An interaction typically concerns two persons, and the interaction corresponds to a temporal interval. Two persons engaged in an interaction are referred to below as play-agent and play-target, where play-agent initiates the interaction while play-target is the recipient of the interaction. For example, a "pass" interaction typically involves two soccer players—a first player (play-agent) kicks the ball at time $t_1$ and a second player (play-target) from the same team obtains the control of the ball at a later time $t_2$. The terms play-agent and play-target refer to interacting persons in general, and the use of the terms play-agent and play-target is not limited to the interactions in sport.

Sometimes there are subtle visual differences in the way a person performs an action depending on the intended interaction. For example, a soccer player may kick a ball differently when their intention is to pass the ball to another player compared to a situation where the intention is to shoot at a goal with the aim of scoring a point for their team. Similarly, a wave to grab the attention of a friend may be different from a wave to grab the attention of a staff member when requesting assistance. Such action recognition plays an important role in automated video analysis. Nevertheless, recognising interactions only from visual differences in the way actions are performed may be very challenging. Recognising interactions is also challenging as most interactions happen over a non-trivial and often varying time interval. Further, the long physical distance between interacting players can add to the difficulty of recognising interactions.

Conventional action recognition methods focus on recognition of low-level single-person actions. Typically, conventional action classifiers have been trained upon the low-level features extracted from videos. The trained action classifiers are then employed to predict actions of individuals. Recently, there has been work that focused human activity recognition in scenes that involve interactions between individuals and higher-level group activities. Hierarchical graphical models have been proposed to model useful cues to distinguish different interactions. One important cue for disambiguating interactions is the context provided by associated players within the interaction. Actions of nearby players are a useful contextual cue for interaction recognition. A few recent action recognition methods include models of group activity context.

A role is associated with a person. The term role may refer to a set of expected behaviours, rights and obligations related to functionality of a corresponding person in a group of people. Specifically, the role of a person exists beyond the interaction in which that the person is involved. For example, someone may have the role of 'shop assistant', 'security personal', 'medical personal' or 'goal keeper' in a scene, and the role is valid even during those temporal intervals that the person is not involved in any interaction of interest. The term 'social role' may also be used to refer to the same concept.

Besides the actions of individuals in an interaction, roles of the individuals provide strong contextual information for interaction classification. For example, in some sports such as soccer, futsal, hockey and water polo, a "pass" usually occurs between players from the same team, whereas a "shoot" sometimes involves a striker from one team and a goalie from the opposite team. It is therefore advantageous to consider the role cue for classifying interactions. Role information in long-term interactions may be used to improve the accuracy of interaction classification.

The present disclosure relates to rich semantic understanding of interactions in video sequences, and in particular the classification of interactions using the role of people interacting over time.

As described in detail below, localisation of an action refers to associating an action to an object involved in the action, and temporally localising by associating the action to a particular frame in the video sequence. Similarly, localisation of interaction refers to the task of finding the spatial and temporal extent of the interaction. In particular, localisation of interaction includes finding start and end frames (i.e., time), and the play agent and the play-target of the interaction.

As also described in detail below, classification (also called categorisation) is the task of assigning an input to a certain group (also called class or category). The output of classification is the label of a group to which an input has been assigned. The assignment of an input to a class is generally based on certain characteristics of the input which are called features. When classes are formed based on some ontology, the classification provides semantic understanding.

The term detection may refer to the joint task of localising and classifying. For example, detecting a set of actions of interest includes localising all occurrences (also called instances) of the actions of interest in a video sequence and assigning a class label to the localised instances.

In one example, the described arrangements are used to analyse and semantically label a video in an archive (e.g., in a video retrieval system). In another example, a live video feed is analysed and semantically labelled with a delay of a few seconds, or an alert is issued to an operator when an interaction of interest is observed in a video feed.

FIG. 1 to FIG. 16 describe one or more arrangements with sport analysis as an example target use-case. Nevertheless, described arrangements may be used in other use-cases and domains such as surveillance, safety, security and marketing analysis.

A method 100 of classifying interactions, using roles of both persons interacting over time, will be described in detail below with reference to FIG. 1. As described, classification of the actions of the persons is updated based on the interactions. The method 100 accepts as input video clips 105 that contain interactions of people.

Figure 13A:
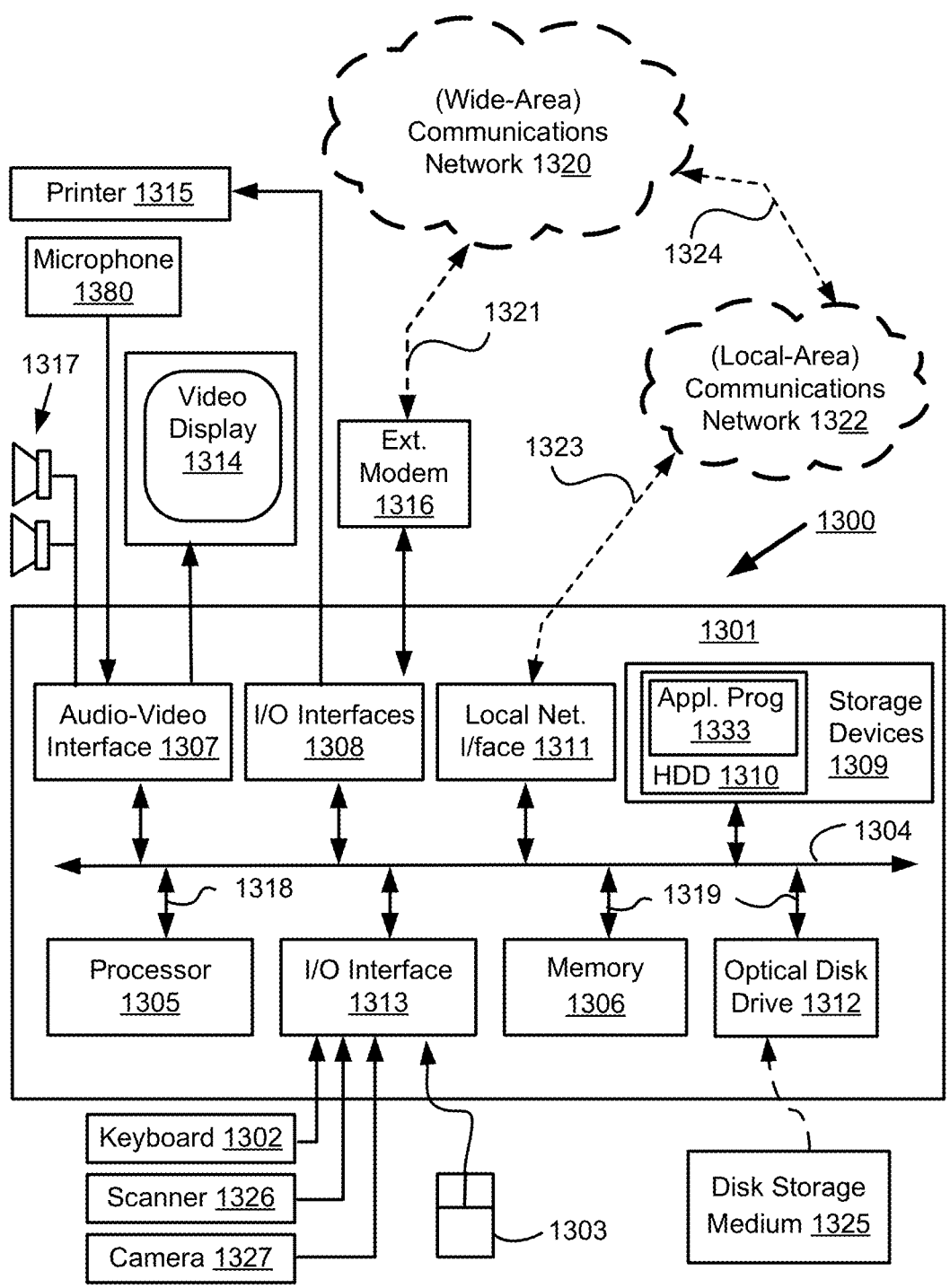
FIGS. 13A and 13B form a schematic block diagram of a general purpose computer system upon which arrangements described can be practiced.
Figure 13B:
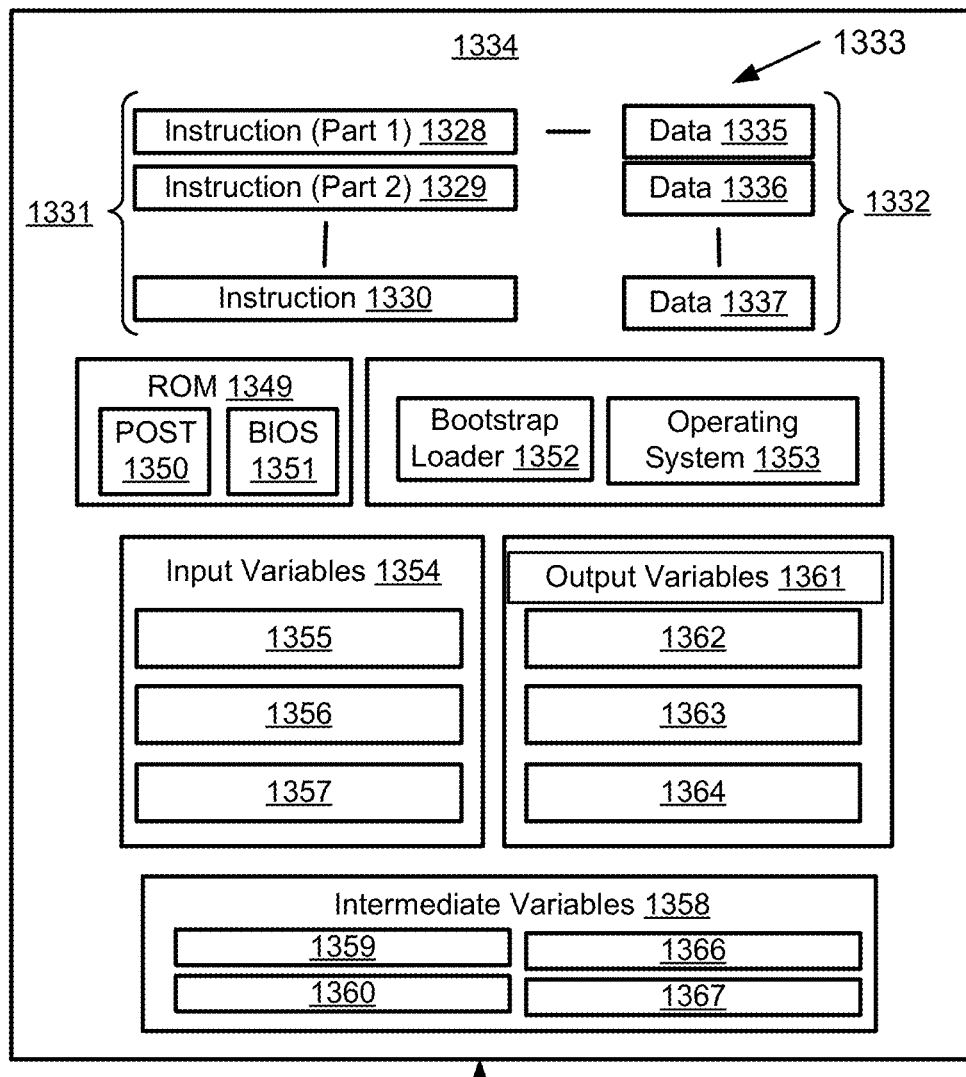
Figure 13B:
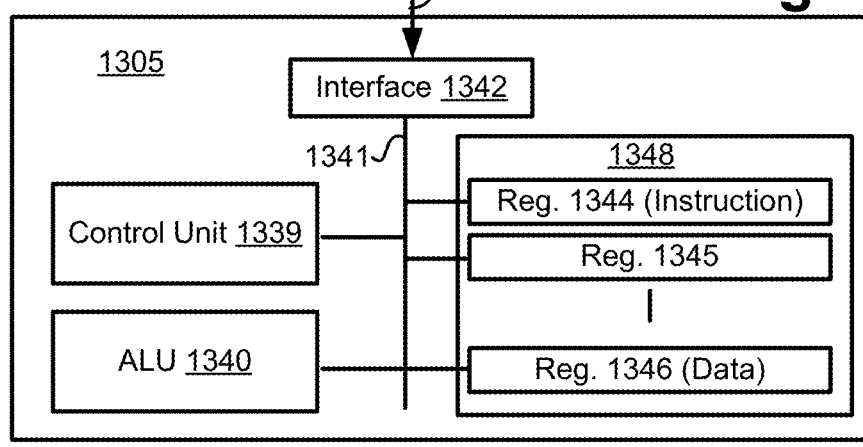

FIGS. 13A and 13B depict a general-purpose computer system 1300, upon which the method 100 and other methods described below can be practiced.

As seen in FIG. 13A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 13A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or a like computer systems.

The described methods may be implemented using the computer system 1300 wherein the processes of FIGS. 1 to 12, to be described, may be implemented as one or more software application programs 1333 executable within the computer system 1300. In particular, the steps of the method 100 are effected by instructions 1331 (see FIG. 13B) in the software 1333 that are carried out within the computer system 1300. The software instructions 1331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for implementing the described methods.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for implementing the described methods.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 13B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 13A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 13A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 13A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 13B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 13A. The execution of a set of the instructions may in some cases result in output of data. Execution may also involve storing data or variables to the memory 1334.

The disclosed arrangements use input variables 1354, which are stored in the memory 1334 in corresponding memory locations 1355, 1356, 1357. The disclosed arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 13B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:
a fetch operation, which fetches or reads an instruction 1331 from a memory location 1328, 1329, 1330;
a decode operation in which the control unit 1339 determines which instruction has been fetched; and
an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 1 to 12 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The described methods may alternatively be implemented in dedicated hardware such as one or more integrated circuits performing the functions or sub functions of described methods. Such dedicated hardware may include graphic processors, digital signal processors, or one or more microprocessors and associated memories.

The interaction detection method 100 starts at people tracking step 110, where a plurality of people in the video sequence are identified under execution of the processor 1305. A method 200 of detecting and tracking players, as executed at step 110, is described hereafter with reference to FIG. 2.

The interaction detection method 100 progresses from people tracking step 110 to feature calculation step 120, where video features are extracted from inputted video clips 105 of the video sequence. The extracted low-level features are used for estimating the actions of the plurality of people identified in step 110. A method 400 of determining video features, as executed at feature calculation step 120, is described hereafter with reference to FIG. 4.

Once the video features are extracted in feature calculation step 120, the interaction detection method 100 executes to action detection step 125, where action moments associated with the plurality of people identified at people tracking step 100 are detected and classified, under execution of the processor 1305. The detected and classified action moments may be stored within the memory 1306. Step 125 involves training action moment classifiers and applying the training action moment classifiers on the extracted video features. In particular, classifiers are trained based on the extracted video features for different action moment classes. A method 500 of training action moment classifiers, as associated with action detection step 125, is described below with reference to FIGS. 5 and 6 collectively. A method 700 of detecting and classifying action moments, as executed at action detection step 125, is described hereafter with reference to FIG. 7.

Figure 6:
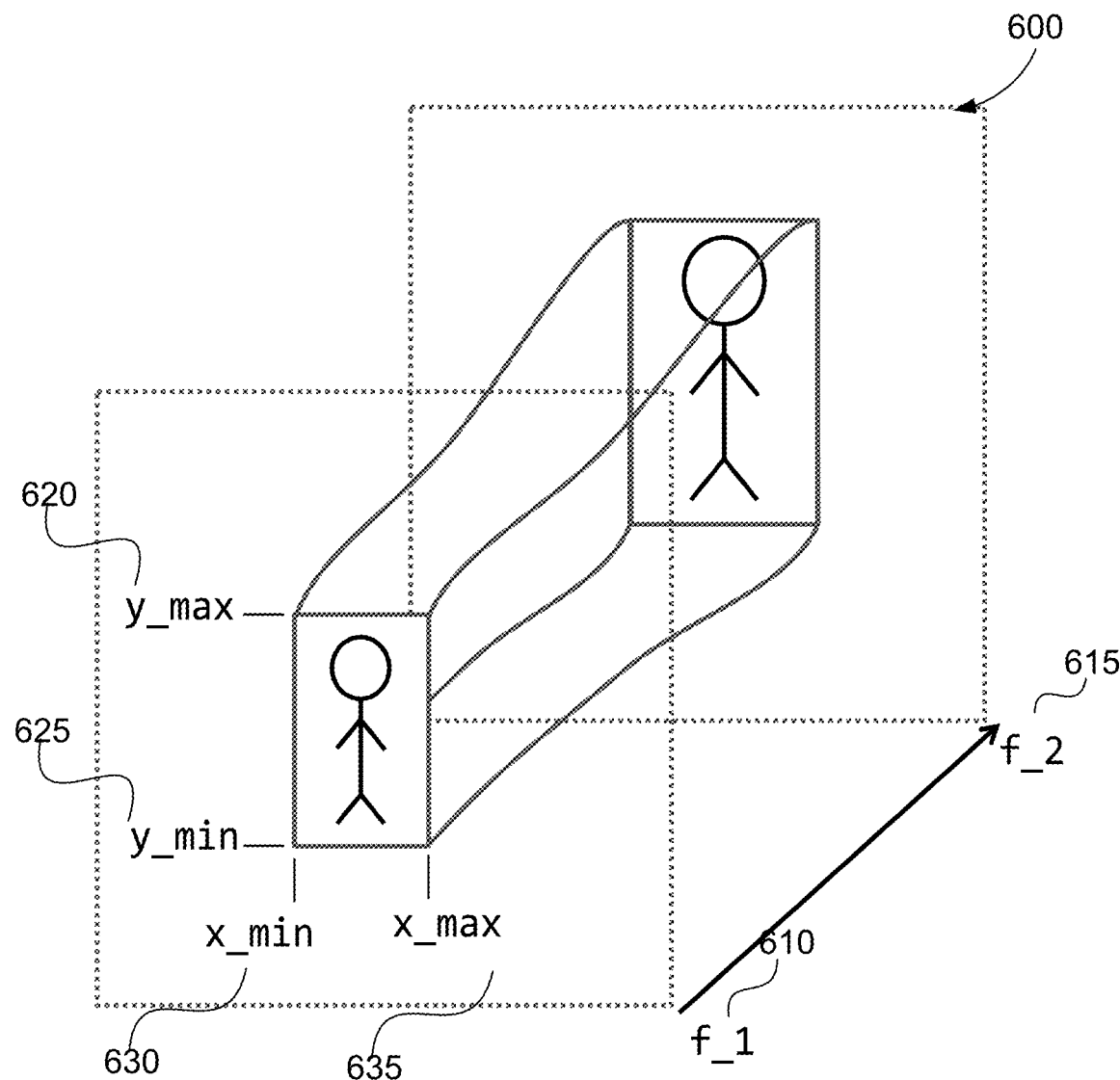
FIG. 6 is a visualisation of an action tube used in the method of FIG. 5.

After the action moments are detected, the action moments are localized temporally in the form of action tubes, which are shown by way of example in FIG. 6. Each action tube specifies the starting 610 and ending 615 of the corresponding action moment.

The interaction detection method 100 then executes to interaction localisation step 130, under execution of the processor 105, where interactions are formed as per the localized action moments to determine interacting play-agents and play-targets. In one arrangement, all the action moments are sorted temporally as per their starting frames. Interactions of persons are formed by grouping temporally adjacent action moments. For each formed interaction, the person whose action moment happens first is referred to as the play-agent, whereas the person whose action moment occurs later is alluded to as the play-target. When an interaction also includes a physical object being passed between interacting people, that object may also be detected and tracked and used to identify the play-agent and play-target and localise the interaction. For example, in ball games, interactions of players often include the ball, and tracking of the ball can be used to help with localising the interaction. An alternative arrangement for such use-cases may include an additional object detection and tracking step for the object of interest.

An alternative arrangement for interaction detection in ball sports may include additional ball (or puck) detection step 115, where the interaction detection method 100 progresses from people tracking step 110 to ball tracking step 115, where the ball (or puck) object is detected and tracked through all video frames. A method 300 of detecting and tracking ball objects, as executed at step 115, is described hereafter with reference to FIG. 3. While FIG. 3 and the associated descriptions use the word 'ball', ball can be replaced with an alternative object of interest relevant to the target use-case. The determined track for the object of interest (e.g., the ball) may be used in action detection step 125 and/or interaction localisation step 130 to improve the localisation (and detection) accuracy.

Once the play-agents and play-targets are determined at interaction localisation step 130, the interaction detection method 100 executes to role determination step 135, where the roles of play-agents and play-targets are determined. The roles of play-agents and play-targets determined at step 135 may be stored in the memory 1306. In one arrangement, the roles are determined by applying classifiers trained on appearance features. For example, in sport games different teams often wear uniform with different colours and logos. Players with special roles, such as goal-keepers or Libero (in volleyball) often wear a jersey of a different appearance. Appearance features such as colour histogram, histogram of gradients, and scale invariant feature transform (SIFT) feature may be extracted to train classifiers for different teams. In another arrangement, the roles are estimated by applying classifiers trained on movement statistics. For instance, in soccer games, the movement of the goal keepers are often limited within a vicinity of the goal area. In this example, movement statistics such as the mean values and the standard deviation values may be used to train classifiers that detect goal keepers.

The role of the play-target may be independent of the estimated action of the play-agent. For example, in a soccer game, the play-agent may be a striker while the play-target may be a goal keeper. The role of the goal keeper stays the same regardless of the actions performed by the striker during their interactions. The role of the play-target may also be independent of the estimated action of the play-target. For example in a soccer game, the goal keeper keeps his role unchanged no matter what actions he performs during the game.

The interaction detection method 100 proceeds to interaction classification step 140, under execution of the processor 105, where the interactions are classified based on the actions and roles of play-agents and play-targets determined in interaction localisation step 130. The classifications determined at step 140 may be stored in the memory 1306. The actions are recognised in action detection step 125 and the roles are determined in role determination step 135. For example, when analysing the videos of soccer games, to detect the "Shoot" interactions that are controlled by the goal-keeper of the opposite team, the action of play-agent (e.g., kick) and the role of play-target (e.g., goal keeper of the opposite team) would be used. For another type of interaction such as successful Pass, the action of play-agent (e.g., kick) and the role of both play-agent and play-target (e.g., a player of home team) is important. A method 1200 of classifying an interaction, using a probabilistic graphical model, is described hereafter with reference to FIGS. 9, 10 and 11 collectively. Alternatively, a method 1200 of classifying an interaction using a rule based method is described hereafter with reference to FIG. 12.

Optionally the interaction detection method 100 proceeds to action reclassification step 145, where the action labels 745 obtained at step 125 may be refined using the classified interactions at step 140. A method 1500 of obtaining action and interaction labels jointly is described below with reference to FIG. 15.

Note that the object detection and tracking in steps 110 and 115, action detection in step 125, interaction localisation in step 130 and role determination in step 135 are noisy estimations, and may include errors.

Figure 2:
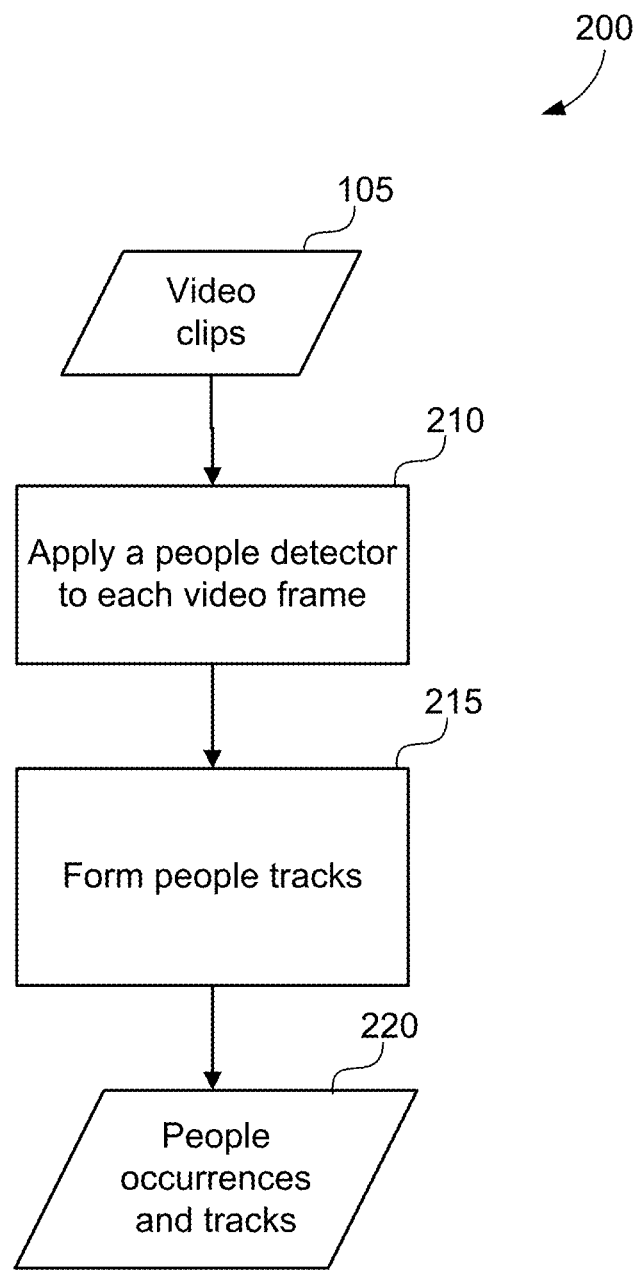
FIG. 2 is a schematic flow diagram showing a method of detecting and tracking players, as executed in the method of FIG. 1.

The method 200 of detecting and tracking players, as executed at people tracking step 110 in FIG. 1, is now described in more detail in FIG. 2. The method 200 may be implemented as one or more software code modules of the software application program 1333 resident in the hard disk drive 1310 and being controlled in its execution by the processor 1305.

The people tracking method 200 accepts video clips 105 as input, under execution of the processor 1305, and applies a people detector to each video frame at people detection step 210. The video clips 105 may be stored in the memory 1306. In one arrangement, a people detector is trained by utilizing a Histograms of Oriented Gradients (HOG) descriptor and a Support Vector Machine (SVM) classifier. Such a people detector is named as a HOG people detector. The HOG descriptor represents an entire person by a single feature vector. The HOG people detector uses a sliding window detection method for detecting the occurrence of people in each video frame. At each detection window, a HOG descriptor is determined. The HOG descriptor is then shown to the trained SVM classifier, which classifies the windows as either "people" or "not people". To detect people at different scales, each video frame is sub-sampled to produce multiple copies. The same HOG people detector may then be applied to each sub-sampled video frame. An alternative arrangement may use an object detector using deep convolutional neural networks.

The people tracking method 200 executes to track forming step 215, where the method 200 forms tracks of people detected at step 210. The tracks forms at step 215 may be stored in the memory 1306. In one arrangement, detected people at adjacent frames may be associated by comparing their appearance feature. For example, a distance measure such as Euclidean (L2) distance, histogram intersection distance, chi-square distance, etc. may be determined by comparing the HOG descriptors or colour histograms for people detected at frame $t_1$ and those detected at frame $t_2$. Two people are considered as the same person if a distance measure of their appearance features are lower than a empirically determined threshold. A track may then be formed by connecting centres of matched people through all frames. A track reveals the movement of a person.

The track forming step 215 generates a set of people tracks 220 as output, where each track is associated with occurrences of a person in all frames. Often a track id is assigned to each generated track.

Figure 3:
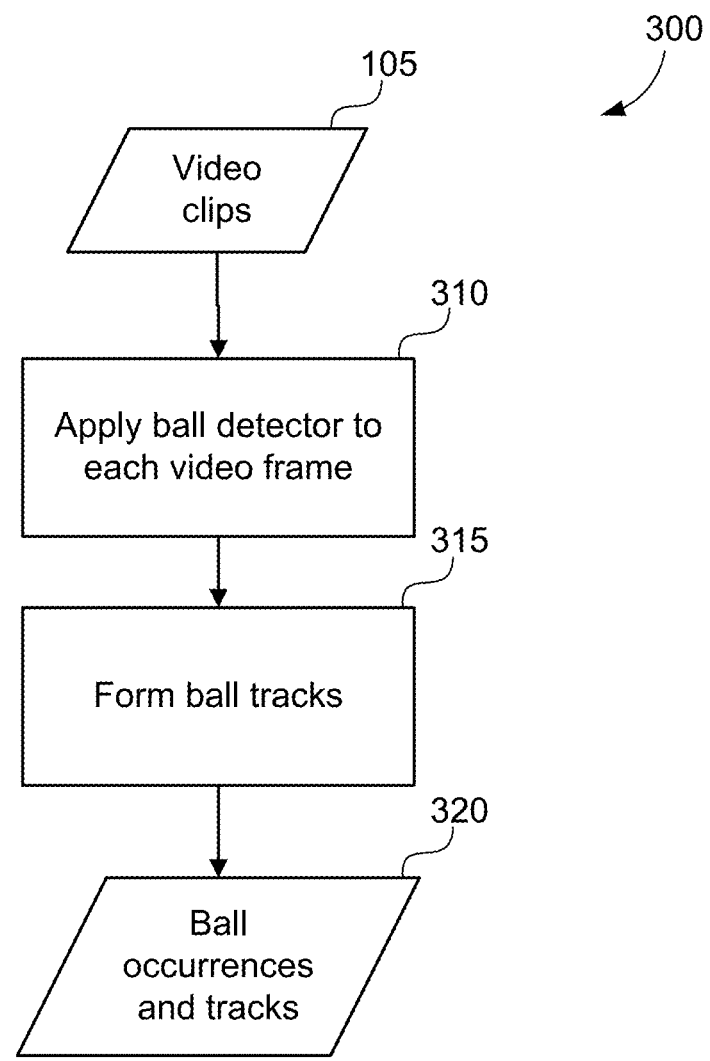
FIG. 3 is a schematic flow diagram showing a method of detecting and tracking a ball.

The method 300 of detecting and tracking a ball object (or an alternative object of interest), as executed at ball step 115 in FIG. 1, will now be described in more detail with reference to FIG. 3. The method 300 may be implemented as one or more software code modules of the software application program 1333 resident in the hard disk drive 1310 and being controlled in its execution by the processor 1305.

The ball tracking method 300 accepts video clips 105 as input, under execution of the processor 105, and applies a ball detector to each video frame at step 210. In one arrangement, a ball detector is trained by utilizing the Scale Invariance Feature Transform (SIFT) descriptor and the Support Vector Machine (SVM) classifier. The SIFT descriptor captures the appearance feature of a ball. Similar to the people detector, the ball detector can detect the occurrence of the ball object by a sliding window approach. At each detection window, a SIFT descriptor is determined. The SIFT descriptor is then shown to the trained SVM classifier, which classifies the windows as either "ball" or "not ball".

The method 300 executes to step 315, where the method 300 forms tracks of the ball object based on the detection result at step 310. The tracks formed at step 315 may be stored in the memory 1306. In one arrangement, the Kalman filter may be applied to track the movement of the ball based on the detection results.

At the end of the execution at step 315, the method 300 returns the occurrences of the ball object in all frames and the ball track 320.

The method 400 of extracting video features, as executed at feature calculation step 120 in FIG. 1, will now be described in more detail with reference FIG. 4. The method 400 may be implemented as one or more software code modules of the software application program 1333 resident in the hard disk drive 1310 and being controlled in its execution by the processor 1305.

The input to the method 400 is video clips 105. At feature calculation step 410, the video clips are loaded and the method 400 determines raw features for each video, where a raw feature is a piece of information that describes certain characteristics of the video. The raw features determined at step 410 may be stored in the memory 1306. In one arrangement, Improved Dense Trajectory (iDT) features are selected as the raw features (as shown in Table 1). The iDT feature descriptor is a hand-crafted descriptor for action in videos. Trajectories are formed by tracking points using median filtering in a dense optical flow field. For each trajectory, multiple descriptors such as trajectory descriptor, Histogram of gradient (HOG), Histogram of optical flow (HOF), and Motion boundary histogram (MBH) descriptors are determined and concatenated to form the iDT feature descriptor. In particular, an iDT feature contains the following properties:

TABLE 1 iDT feature descriptor properties.

| Property name | Description |
| --- | --- |
| frameNum | The trajectory ends on which frame |
| mean_x | The mean value of the x coordinates of the trajectory |
| mean_y | The mean value of the y coordinates of the trajectory |
| var_x | The variance of the x coordinates of the trajectory |
| var_y | The variance of the y coordinates of the trajectory |
| length | The length of the trajectory |
| scale | The trajectory is computed on which scale |
| x_pos | The normalized x position w.r.t. the video (0~0.999) |
| y_pos | The normalized y position w.r.t. the video (0~0.999) |
| t_pos | The normalized t position w.r.t. the video (0~0.999) |
| Trajectory | 2 × trajectory length (default 30) |
| HOG | 8 × spatial cells × spatial cells × temporal cells (default 96) |
| HOF | 9 × spatial cells × spatial cells × temporal cells (default 108) |
| MBHx | 8 × spatial cells × spatial cells × temporal cells (default 96) |
| MBHy | 8 × spatial cells × spatial cells × temporal cells (default 96) |

An alternative arrangement, may use features extracted using a convolutional neural network trained for detecting actions of interest.

In one arrangement, the feature calculation method 400 progresses to dimension reduction step 415, where the dimensions of the raw video features stored in the memory 1306 are reduced. In one arrangement, the dimension reduction is conducted by Principle Component Analysis (PCA). PCA is a statistical procedure that uses an orthogonal transformation to convert a set of observations of possibly correlated variables into a set of values of linearly uncorrelated variables named principal components. The dimension reduction step 415 is an optional step which may be used to reduce computational cost of action detection. However, when the features determined in feature calculation step 410 are high dimensional (such as iDT features) using dimension reduction step 415 is recommended. When dimension reduction is conducted using a decorrelating method such as PCA, the recognition accuracy may also improve due to the decorrelating effect of PCA transform.

The feature calculation method 400 returns with a set of processed video features 420 for each video clip.

Figure 5:
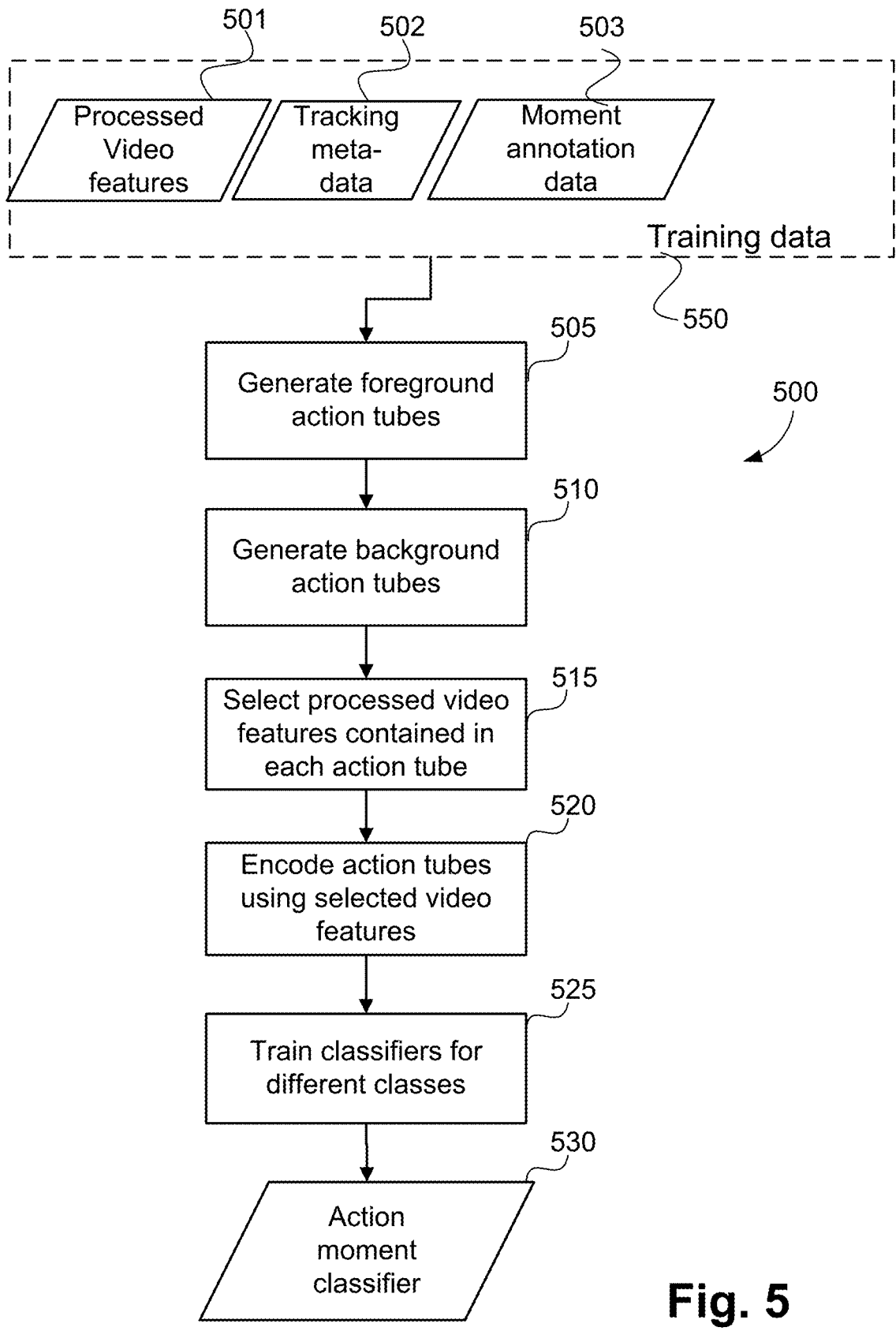
FIG. 5 is a schematic flow diagram showing a method of training action moment classifiers, as executed in the method of FIG. 1.
Figure 7:
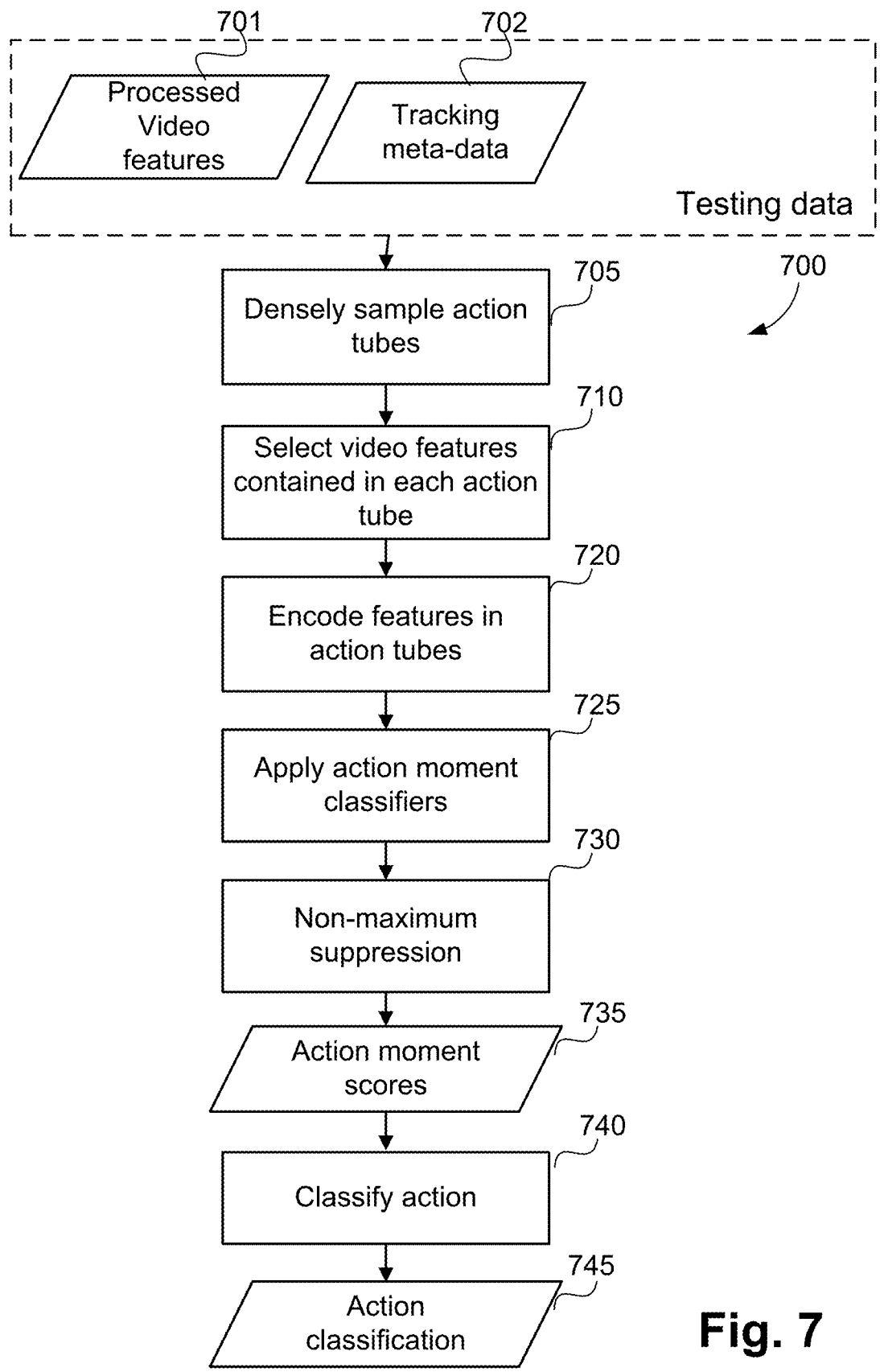
FIG. 7 is a schematic flow diagram showing a method of detecting and classifying action moments.

The method 500 of training action moment classifiers, as executed at action detection step 125 in FIG. 1, will now described in more detail by way of example with references to FIG. 5, FIG. 6, and FIG. 7 collectively. The term action moments refer to moments (e.g., the frames) in which a particular action occurs. The method 500 may be implemented as one or more software code modules of the software application program 1333 resident in the hard disk drive 1310 and being controlled in its execution by the processor 1305.

In one arrangement, action moment detection is achieved by applying trained action moment classifiers to extracted video features 420 and tracking data 220.

Figure 4:
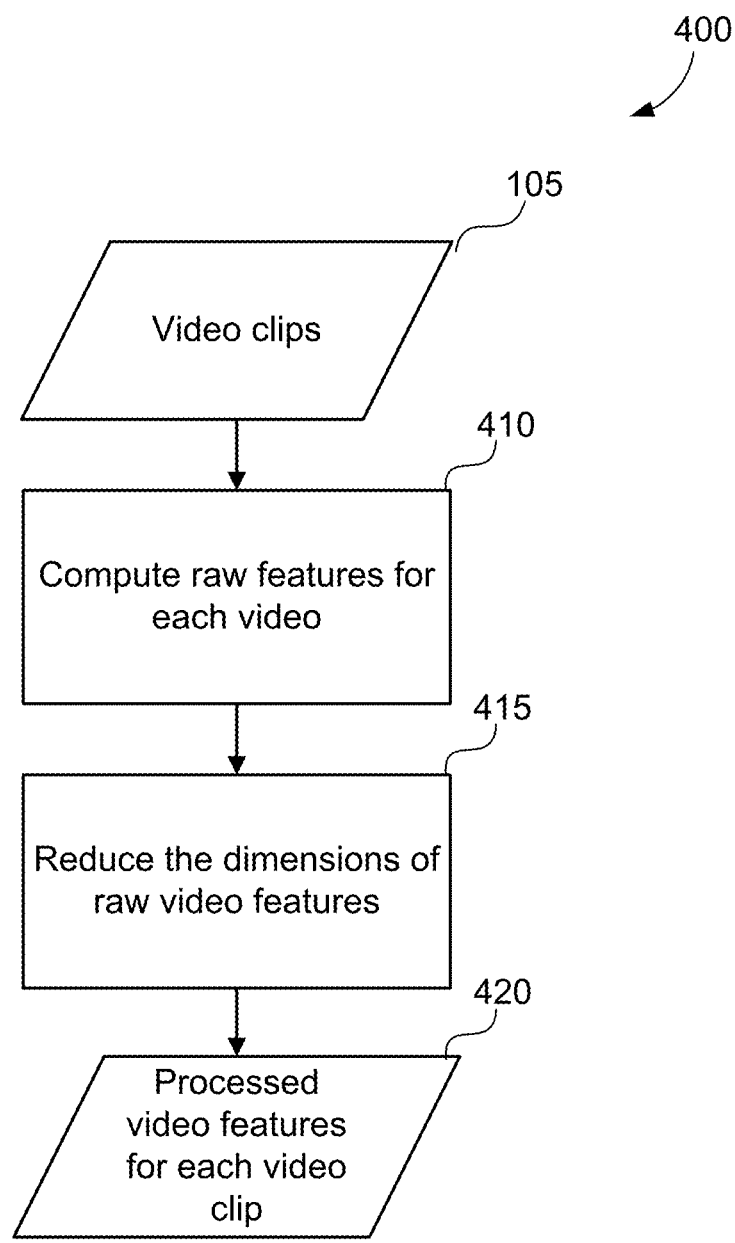
FIG. 4 is a schematic flow diagram showing a method of determining video features.

The input to the method 500 consists of processed video features 501 determined using feature calculation method 400 described with respect to FIG. 4 and for the video sequences in training set 550, tracking metadata 502 and moment annotation data 503 for the video sequences in the training set 550. The training set 550, tracking metadata 502 and moment annotation data 503 may be stored in the memory 1306. At training, the tracking metadata 502 may be generated by tracking people using people tracking method 200 as is used in people tracking step 110, or provided as part of the training data, for example, by manually tracking people using a software tool. The moment annotation data may contain the starting frame, ending frame, people identifier (id) (e.g., in the form of associated track identifier (id)), and action moment label for each action moment.

The action moment classifier training method 500 starts with foreground action tube forming step 505, where foreground action tubes are generated, under execution of the processor 1305, using moment annotation data 503 stored in the memory 1306. As shown in FIG. 6, a foreground action tube contains an instance of an action of interest, and the foreground action tube is specified by a frame range which includes a starting frame 610, and an ending frame 615, and a spatial extent for each frame inside the tube. A spatial extent for each frame inside the tube is given by a bounding box specified by the top-left (y_max) 620, (x_min) 630, and bottom-right (y_min) 625, (x_max) 635 corners over a corresponding frame range. For every annotated moment that maps to an action moment label, an action tube is created with a predefined number of frames (e.g., twenty five (25) frames.

The action moment classifier training method 500 executes to background action tube forming step 510, where background action tubes are generated using moment annotation data 503 stored in the memory 1306. A background action tube contains no action of interest. In one arrangement, background action tubes are generated by randomly selecting an action tube which does not temporally overlap with any of the foreground action tubes generated in foreground action tube forming step 505.

Next, the action moment classifier training method 500 progresses to feature selection step 515, where, for each action tube produced at foreground action tube forming step 505 and background action tube forming step 510, the subset of processed video features 501 contained in the determined action tube are selected for the purpose of describing the action tube. In step 515, each processed video feature (e.g., each calculated iDT feature vector) is assigned, under execution of the processor 1305, either to a corresponding action tube with a temporal and spatial match or is discarded if no matching action tube is found. The matching may be done based on the ending frame number of the iDT feature and the frame number range of the action tube as well as the mean x and y position of the iDT feature.

The action moment classifier training method 500 executes to feature encoding step 520, where, under execution of the processor 1305, each action tube is now associated with a variable number of iDT features contained within the action tube. Feature encoding step 520 forms a single encoding vector for each action tube from the statistics of the associated video features. In one arrangement, Fisher vector encoding may be used to encode the features, which means each action tube is encoded by a Fisher vector. In an alternative arrangement, Vector of Locally Aggregated Descriptors (VLAD) encoding may be used at step 520 to encode the features.

Once all action tubes have been encoded, each action tube is then described by a single encoding vector which encodes all associated video features.

The method 500 executes to classifier training step 525, where, under execution of the processor 1305, action moment classifiers are trained to classify actions contained in the spatio-temporal action tubes based on their encoding vectors. A multi-class linear SVM may be used with the Fisher-vectors that have been encoded for each action tube at step 520 action moment classifier training and a corresponding label for the action contained in the action tube. At training time, each action tube (either foreground or background) m (m∈0, ..., $N_{AT}$) ($N_{AT}$ stands for the total number of action tubes) in the training set has a single Fisher vector $F_m$ and a corresponding target action class $y_m$. In one arrangement, the classifier is trained using one-versus-rest (OVR) multi-class classification, where $N_C$ ($N_C$ is the number of binary classifiers) binary classifiers are trained to discriminate each class separately against all other classes. In an alternative arrangement, pair-wise multi-class SVM classifiers, or multinomial logistic regression (also known as softmax) classifiers may be used at step 530. At the end of the action moment classifier training method 500, the multi-class classifier trained in the classifier training step 525 is returned as the action moment classifier 530.

The action moment detection method 700 of detecting and classifying action moments, as executed in step 125, will now be described with reference to FIG. 7. The method 700 may be implemented as one or more software code modules of the software application program 1333 resident in the hard disk drive 1310 and being controlled in its execution by the processor 1305.

The input to the action moment detection method 700 consists of processed video features 701 determined at feature calculation step 120, tracking metadata 702 determined at people tracking step 110 (and optionally ball (or other objects) tracking step 115).

At feature encoding step 710, the processed video feature 701 associated with each selected action tube is selected using a similar method to that employed in step 515 of FIG. 5. At feature encoding step 720, the selected video features for each action tube is encoded as a single feature vector, under execution of the processor 1305, using a similar method to that used in step 520 of FIG. 5. At action moment classification step 725, the trained action classifiers from step 525 of FIG. 5 is applied to each action tube to obtain the action classification scores which may be stored in the memory 1306.

Figure 8:
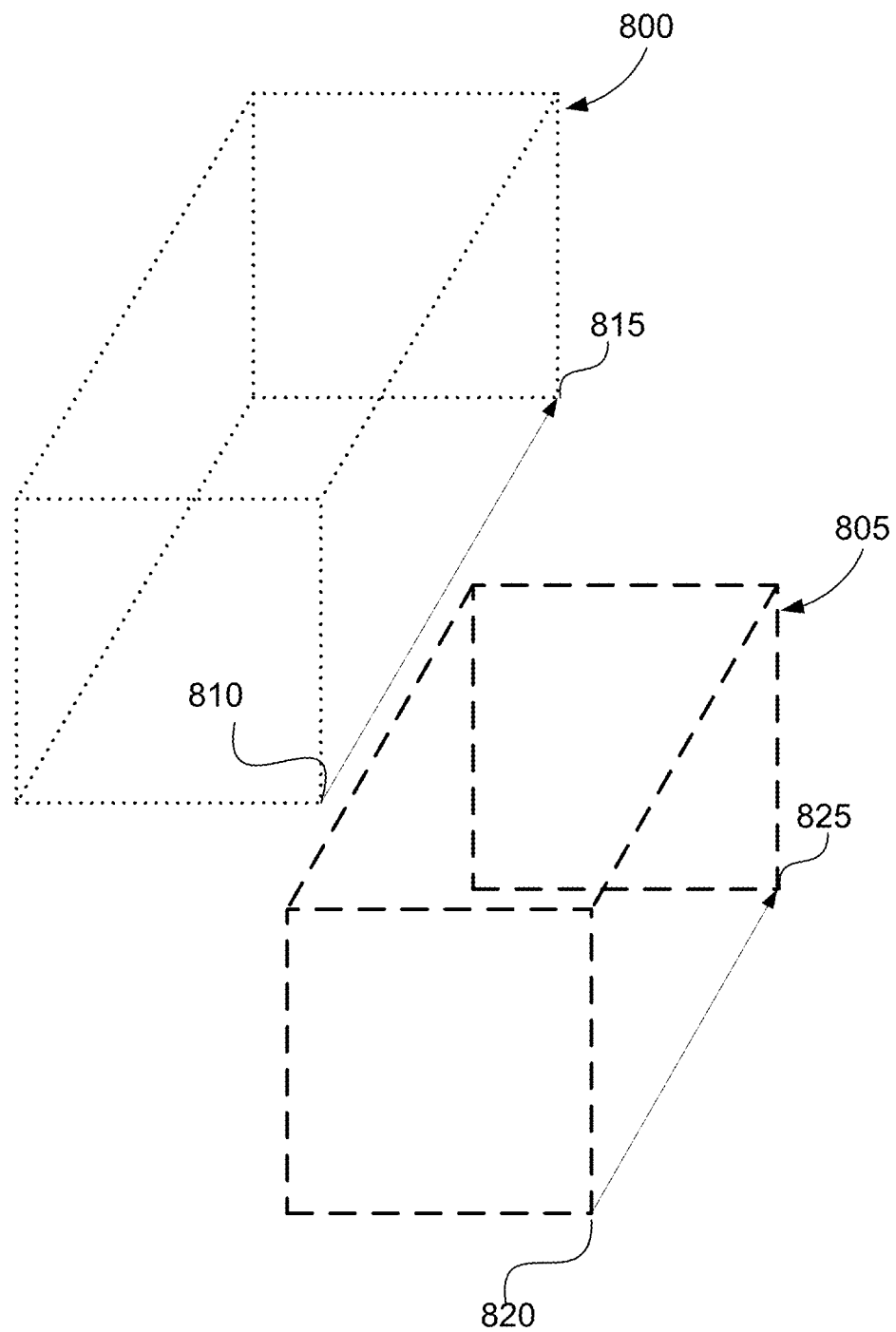
FIG. 8 shows two example action tubes.

By the end of step 725 the action classification scores are available for all action tubes. The classification scores may be stored in the memory 1306. In order to determine the temporal location (localise) of the actions, non-maximum suppression is applied to the classification scores, under execution of the processor 1305, at step 730. The non-maximum suppression method of step 730 is a locally greedy algorithm which localises the actions of interest by greedily selecting action tubes with the maximum score in a local spatio-temporal neighbourhood and suppressing the selection of other action tubes within this local spatio-temporal neighbourhood. The local spatio-temporal neighbourhood may be defined using measures such as a temporal overlap (i.e., temporal intersection over union), a fixed temporal window, or spatio-temporal intersection over union. For example, FIG. 8 shows two action tubes, namely 800 and 805. Action tube 800 has a temporal duration defined by start frame 810 and end frame 815. Similarly, action tube 805 is defined by 820 and 825 temporally. Action tubes 800 and 805 have overlaps. The temporal union of the two action tubes 800 and 805 is defined by an interval starting at frame min(810, 820), and ends at frame max(815, 825), where min(.,.) returns the minimum of given two frames and max(.,.) returns the maximum of given two frames. The temporal intersection of the two action tubes 800 and 805 is defined by the interval starting at max(810, 820), and ending at frame min(815, 825). Often a fixed overlap temporal window of half-width T is used in the non-maximum suppression step 730 and score with time within T of a selected local maximum is suppressed.

The action moment classification step 740 uses the action moment scores 735 and generates action classification 745 for the action tubes detected by non-max suppression step 730, by classifying according to the class with the highest score.

The method 1100 of classifying the interactions, based on recognised actions and roles, as executed at interaction classification step 140 in FIG. 1, will now be described in more detail with reference to FIG. 9, FIG. 10, and FIG. 11 collectively.

Figure 9:
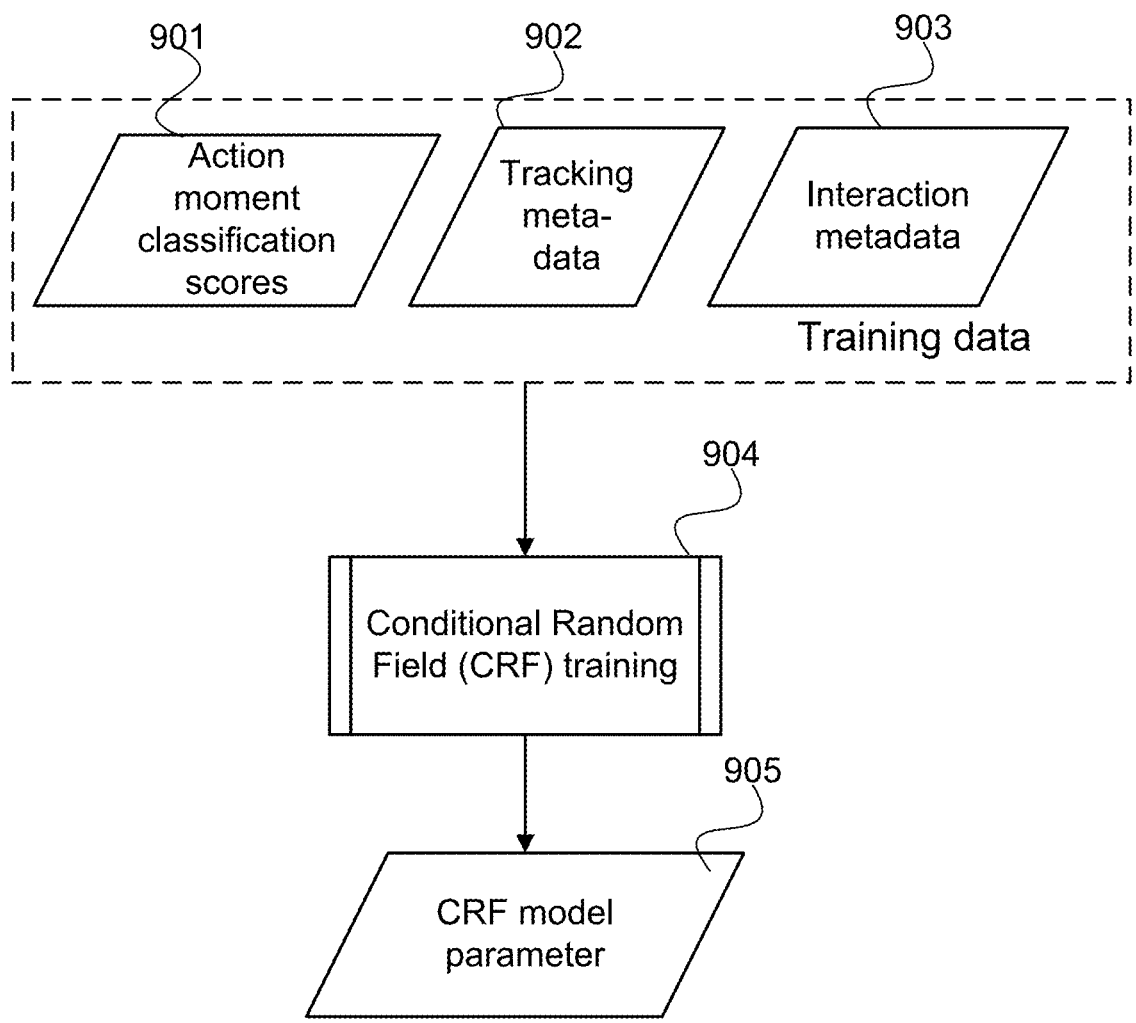
FIG. 9 is a data flow diagram showing a method of training a conditional random field model.

FIG. 9 is a data flow diagram showing a method 900 of training a conditional random field (CRF) model for use in classifying interactions. The method 900 may be implemented as one or more software code modules of the software application program 1333 resident in the hard disk drive 1310 and being controlled in its execution by the processor 1305.

Figure 14:
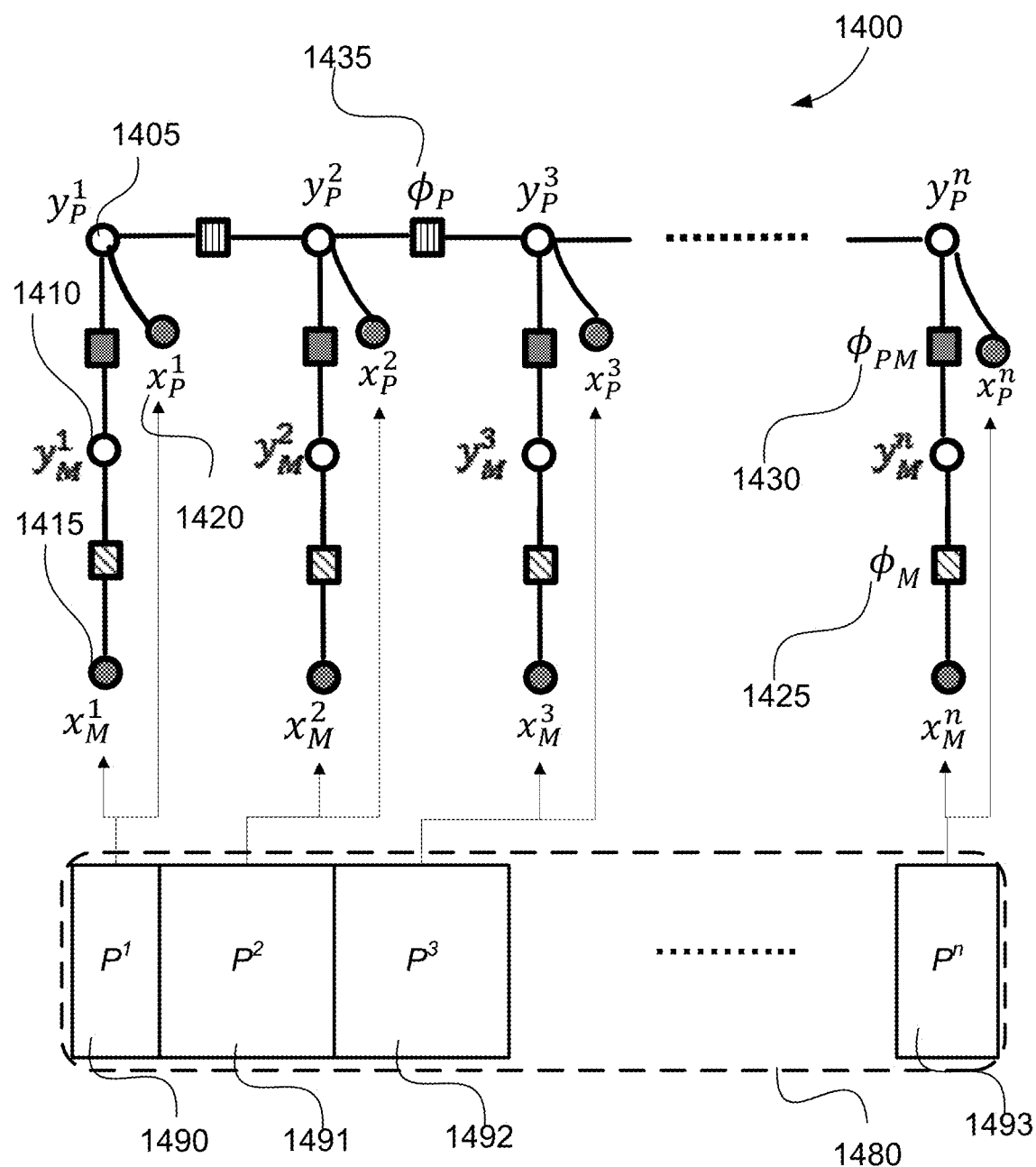
FIG. 14 is a visualization showing a method of training a conditional random field model for classifying interactions and actions jointly.

In one arrangement, the training data for the CRF model comprises action moment classification scores 901 obtained from action moment classification step 725 in FIG. 7, tracking metadata 902, and interaction metadata 903. The tracking metadata is obtained from the execution of people and ball tracking methods 200 and 300 respectively. The interaction metadata 903 contains the ground truth labels for each interaction in the video. The interaction metadata 903 also contains information about the corresponding action moments for each interaction. The information may be used as a lookup table to retrieve corresponding action moment classification scores for each interaction. In one arrangement, action moment classification scores are determined for action moments defined by ground truth from the training set. Specifically, the temporal information (start and end frames) for each action moment is obtained from the ground truth. In an alternative arrangement, action moment classification scores are determined on action moments obtained by applying the method 700 on the training video set. Specifically the temporal information for each action moment from the training set is derived by method 700. A set of CRF model parameters is obtained, under execution of the processor 1305, at Conditional random field training step 904. In one arrangement, the Conditional random field model 1000 shown in FIG. 10 is used. In an alternative arrangement, the Conditional random field model 1400 depicted in FIG. 14 is used. The set of CRF model parameters is obtained at step 904 based on the training data. In an alternative arrangement, training data may consist of tracking metadata, and metadata derived from scene appearance characteristics, along with role and action information.

Figure 10:
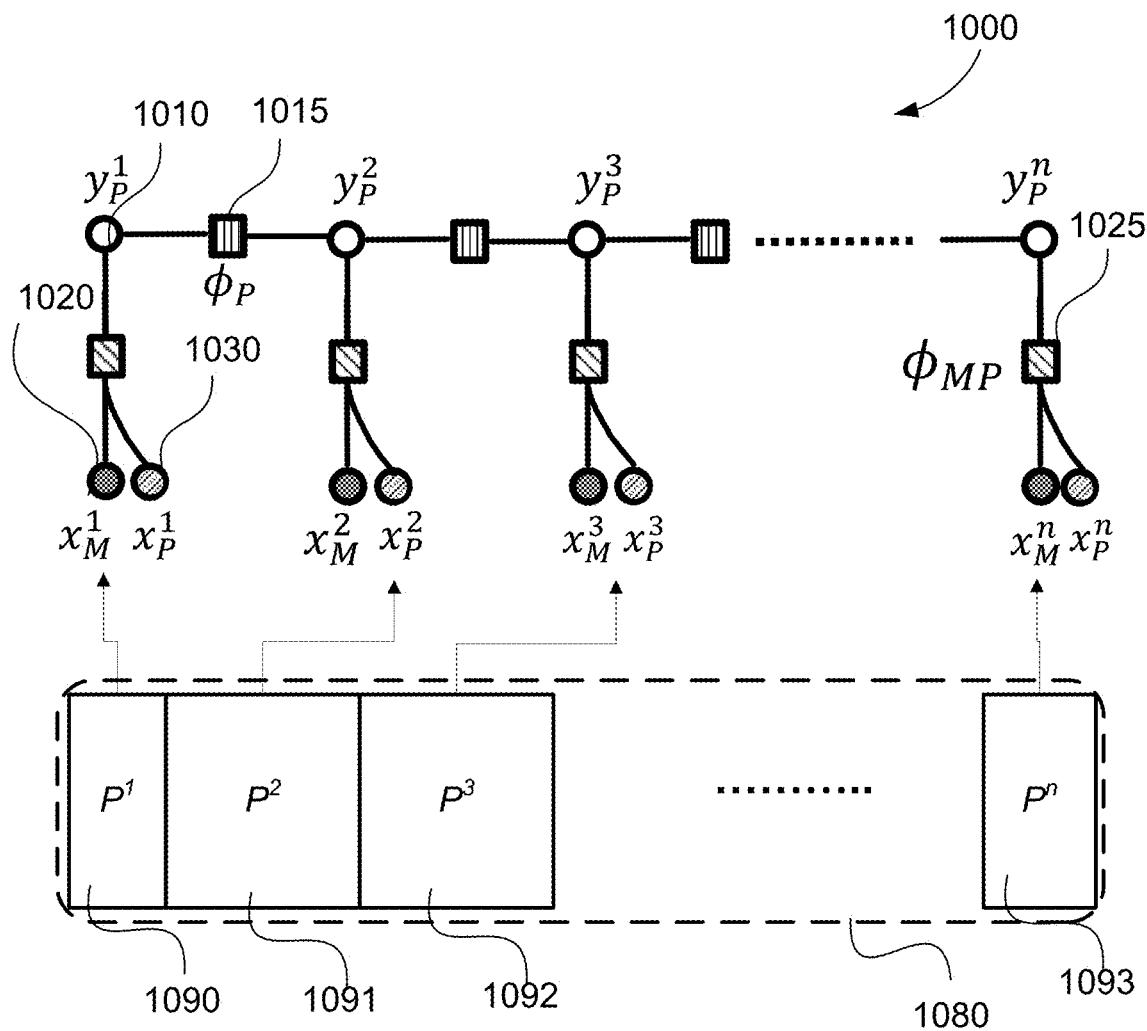
FIG. 10 is a visualisation of an example graphical model for jointly classifying interactions with action moment scores and role information.

FIG. 10 is a visualisation of a chain-structured conditional random field model 1000 for classifying interactions with action moment scores and role information, as used in interaction detection using CRF. In the visualisation of the CRF model shown in FIG. 10, empty circles ($y''_p$) indicate output variables, and filled circles ($x''_m$, $x''_p$) represent input variables. Filled squares ($\phi_{MP}$, $\phi_P$). 40 represent potential functions for which the parameters are learned using the training data. A potential function in a CRF stands for a function of a subset of all input variables. The training data represents a sequence of interactions which contains interactions $P^1$ 1090, $P^2$ 1091, $P^3$ 1092, ..., $P^n$ 1093. Each interaction contains both the starting and ending action moments.

The depicted CRF models the conditional distribution between the classes of action moment and interaction in accordance with Equations (5) and (6), as follows:

$$P(Y|X) = \frac{1}{Z(X)} \exp(-E(X, Y; W)) \quad (5)$$

where, $$Z(X) = \sum_y \exp(-E(X, Y; W))$$

$$E(X, Y; W) = E(y_p^1, y_p^2, y_p^3, ..., y_p^n, x_{MP}^1, x_{MP}^2, ..., x_{MP}^n; w) = \quad (6)$$

$$\sum_{i=1}^{n} \phi_{MP}(y_p^i, x_{MP}^i; w_{MP}) + \sum_{i=1}^{n-1} \phi_P(y_p^i, y_p^{i+1}; w_P)$$

In Equation (6):
n is the number of interactions;
$Y=(Y_p^1, Y_p^2, Y_p^3, ..., Y_p^n)$ represents the output variables in the CRF model;
$y=(y_p^1, y_p^2, y_p^3, ..., y_p^n)$ is a value of Y. Each $y_p^i$ 1010 represents an interaction label from a state set S which contains fixed number of states;
$X=(X_{MP}^1, X_{MP}^2, X_{MP}^3, ..., X_{MP}^n)$ represents the input variables in the CRF model;
$x=(x_{MP}^1, x_{MP}^2, x_{MP}^3, ..., x_{MP}^n)$ is a value of X. Each $x_{MP}^i$ is a concatenation of $x_M^i$ and $x_P^i$, i.e., $x_{MP}^i=x_M^i$, $x_P^i$. In particular, $x_M^i$ 1020 is an interaction feature which is obtained by concatenating the moment classification scores 730 from start and end action moments of an interaction, and $x_P^i$ 1030 is a vector which encodes the following information for the corresponding interaction:
  Whether the track id of play-agent is the same as the track id of the play-target: 1 if the track id of the play agent and the track id of the play-target are the same and 0 otherwise.
  Whether the team ids of the play agent is the same as the team id of the play-target: 1 if the team id of the play agent and the team ids of the play-target are the same and 0 otherwise.
  Optionally, the ball position at both the starting and ending moments: 1 if the ball is in goal area and 0 otherwise.

$\phi_{MP}(y_P, x_{MP}; w_{MP})$ 1025 is the unary potential function which models the dependencies between an interaction label $y_P$ and the interaction feature $x_{MP}$. $w_{MP}$ is the model parameter of the potential function.

$\phi_P(y_P, y'_P; w_P)$ 1015 is a pairwise potential function which models the dependencies (e.g. statistical correlation) between interaction label $y_P$ and $y'_P$. $w_P$ is the model parameter of the pairwise potential function.

Given a training set $\{(x^i, y^i)\}_{i=1}^m$, with m training examples, model parameters $w_{MP}$, $w_P$ for the CRFs may be determined in the max-margin framework for solving a structural support vector machine. Solving a structural support vector machine is described for example in the article by Simon Lacoste Julien, Martin Jaggi, Mark Schmidt, and Patrick Pletscher. *Block-Coordinate Frank-Wolfe Optimization for Structural SVMs*. International Conference on Machine Learning (ICML) 201.

Figure 11:
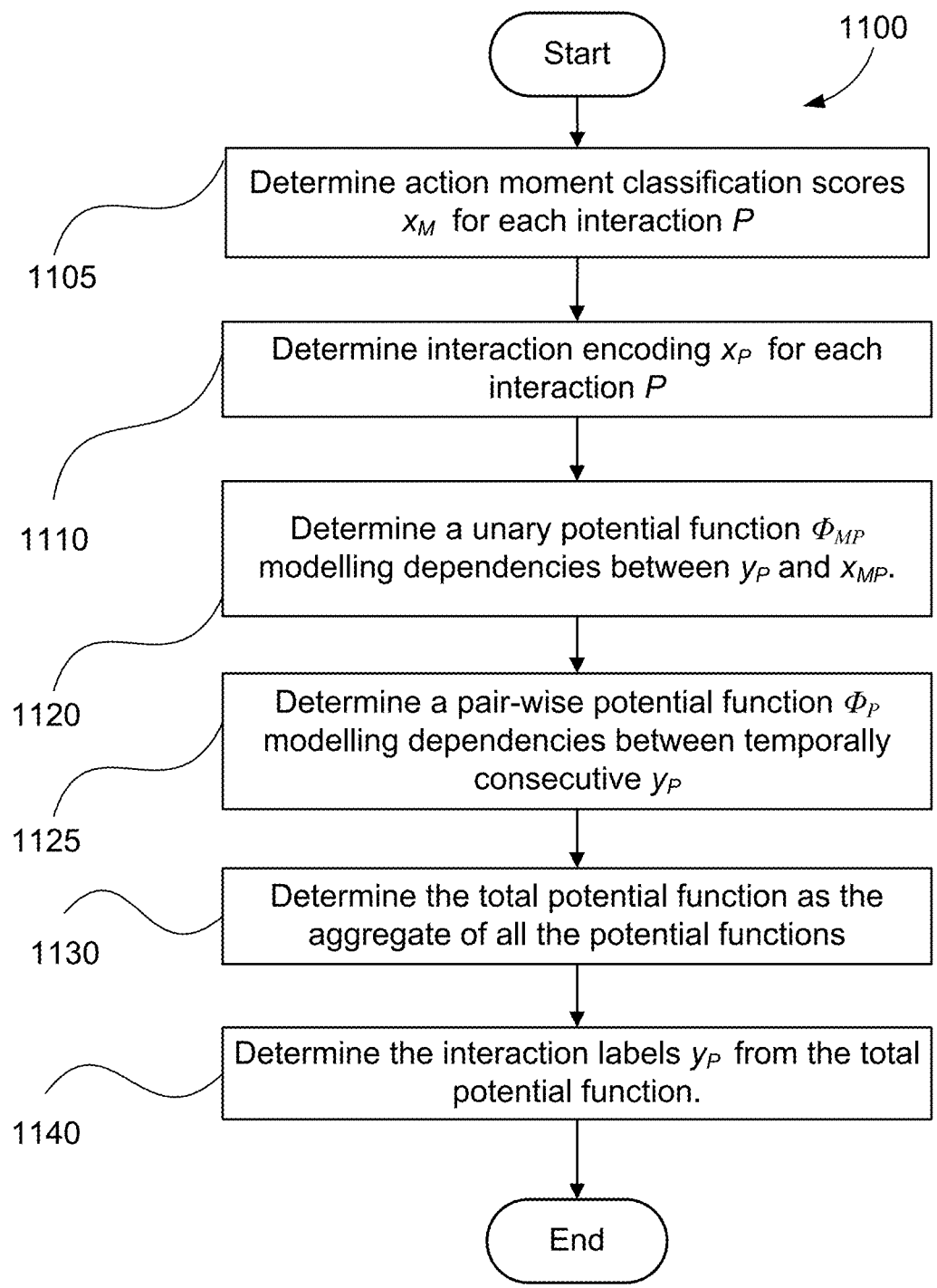
FIG. 11 is a schematic flow diagram showing a method of classifying an interaction based on action scores and recognised roles.
Figure 12:
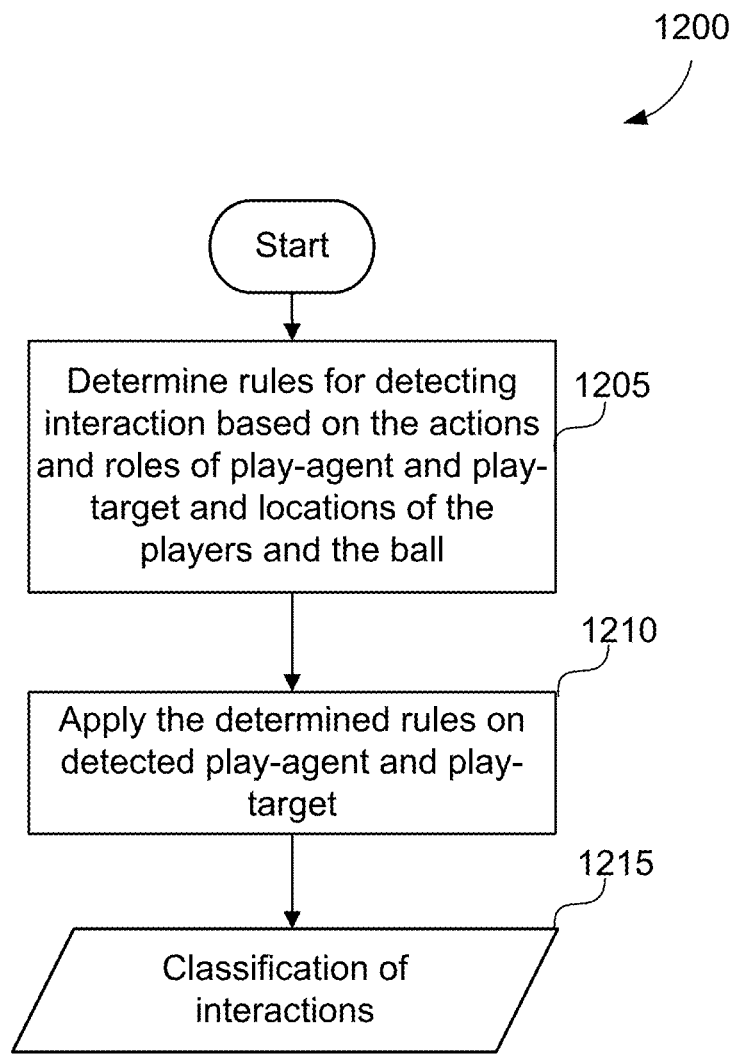
FIG. 12 is a schematic flow diagram showing a method of classifying the interaction based on recognised actions and roles.

FIG. 11 is a schematic flow diagram showing the method 1100 of classifying the interaction based on recognised actions and roles using the trained CRF model 1000 of FIG. 10. The method 1100 may be implemented as one or more software code modules of the software application program 1333 resident in the hard disk drive 1310 and being controlled in its execution by the processor 1305.

For each interaction P, under execution of the processor 1305, the method 1100 determines the associated action moment classification score 735 $x_M$ at action moment classification step 1105. The associated action moment classification score 735 $x_M$ may be stored in the memory 1306. Then at interaction encoding step 1110, an interaction encoding $x_P$ is determined.

Using $x_M$, $x_P$, and the model parameters $w_{MP}$, $w_P$, the method 1100 determines a unary potential function $\phi_{MP}$ modelling dependencies between $y_P$ and $x_{MP}$, at unary potential function determination step 1120. Then at pairwise potential function determine step 1125, a pairwise potential function $\phi_P$ modelling dependencies between temporally consecutive $y_P$ is determined, under execution of the processor 1305.

The total potential function is determined as the aggregate of all potential function at total potential function determining step 1130. Then at interaction labels determining step 1140, the label $y_P$ for the interaction is determined as the label that maximises the total potential function. A Bayesian belief propagation algorithm may be applied to the graphical model depicted in FIG. 10, at step 1140.

FIG. 14 is a visualisation of a chain-structured conditional random field model 1400 for jointly classifying actions and interactions using action moment scores and role information, as used in interaction detection using CRF. The obtained action labels may be used to refine the actions at step 145 of method 100.

In the visualization of the CRF model shown in FIG. 14, empty circles ($y''_p$, $y''_M$) indicate output variables, and filled circles ($x''_m$, $x''_p$) represent input variables. Filled squares ($\phi_M$, $\phi_{PM}$, $\phi_P$) represent potential functions for which the parameters are learned using the training data. The training data represents a sequence of interactions which contains interactions $P^1$ 1490, $P^2$ 1491, $P^3$ 1492, ..., $P^n$ 1493. Each interaction contains both the starting and ending action moments.

The depicted CRF models the conditional distribution between the classes of action moment and interaction in accordance with Equations (5) and (7), as follows:

$$E(X,Y;W) = E(y_p^1, y_p^2, y_p^3, \ldots, y_p^n, y_M^1, y_M^2, y_M^3, \ldots, y_M^n, x_{MP}^1, x_{MP}^2, \ldots, x_{MP}^n; w) = \sum_{i=1}^n \phi_M(y_M^i, x_M^i; w_M) + \sum_{i=1}^n \phi_{PM}(y_M^i, y_P^i; w_{PM}) + \sum_{i=1}^{n-1} \phi_P(y_P^i, y_P^{i+1}; w_P)$$ (7)

In Equation (6):

n is the number of interactions;

$Y = (Y_p^1, Y_p^2, Y_p^3, \ldots, Y_p^n, Y_m^1, Y_m^2, Y_m^3, \ldots, Y_m^n)$ represents the output variables in the CRF model;

$y = (y_p^1, y_p^2, y_p^3, \ldots, y_p^n, y_m^1, y_m^2, y_m^3, \ldots, y_m^n)$ is a value of Y. Each $y_p^i$ 1405 represents an interaction label from a state set $S_p$ which contains fixed number of states. Each $y_m^i$ 1410 represents an action label from a state set $S_m$ which contains fixed number of states $X = (X_P^1, X_P^2, X_P^3, \ldots, X_P^n, X_M^1, X_M^2, X_M^3, \ldots, X_M^N)$ represents the input variables in the CRF model;

$x = (x_p^1, x_p^2, x_p^3, \ldots, x_p^n, X_M^1, X_M^2, X_M^3, \ldots, X_M^n)$ is a value of X. In particular, $x_M^i$ 1415 is the moment classification scores 730 from start action moments of an interaction, and $x_P^i$ 1420 is a vector which encodes the following information for the corresponding interaction:

Whether the track id of play-agent is the same as the track id of the play-target: 1 if the track id of the play agent and the track id of the play-target are the same and 0 otherwise.

Whether the team ids of the play agent is the same as the team id of the play-target: 1 if the team id of the play agent and the team ids of the play-target are the same and 0 otherwise.

Optionally, the ball position at both the starting and ending moments: 1 if the ball is in goal area and 0 otherwise.

$\phi_M(y_M, x_M; w_M)$ 1425 is the unary potential function which models the dependencies between a moment label $y_P$ and the moment classification scores $x_M$. $w_M$ is the model parameter of the potential function.

$\phi_{PM}(y_P, y_M; w_{PM})$ 1430 is the pariwise potential function which models the dependencies between a starting moment label $y_M$ and the interaction label $y_P$. $w_{PM}$ is the model parameter of the potential function.

$\phi_P(y_P, y'_P; w_P)$ 1435 is a pairwise potential function which models the dependencies (e.g. statistical correlation) between interaction label $y_P$ and $y'_P$. $w_P$ is the model parameter of the pairwise potential function.

Given a training set $\{(x^i, y^i)\}_{i=1}^m$ ($x^i \in X'$, $y^i \in y'$), with m training examples, model parameters $w_P$, $w_{PM}$, $w_P$ for the CRFs may be determined in the max-margin framework for solving a structural support vector machine. Solving a structural support vector machine is described for example in the article by Simon Lacoste Julien, Martin Jaggi, Mark Schmidt, and Patrick Pletscher. *Block-Coordinate Frank-Wolfe Optimization for Structural SVMs*. International Conference on Machine Learning (ICML) 201.

Figure 15:
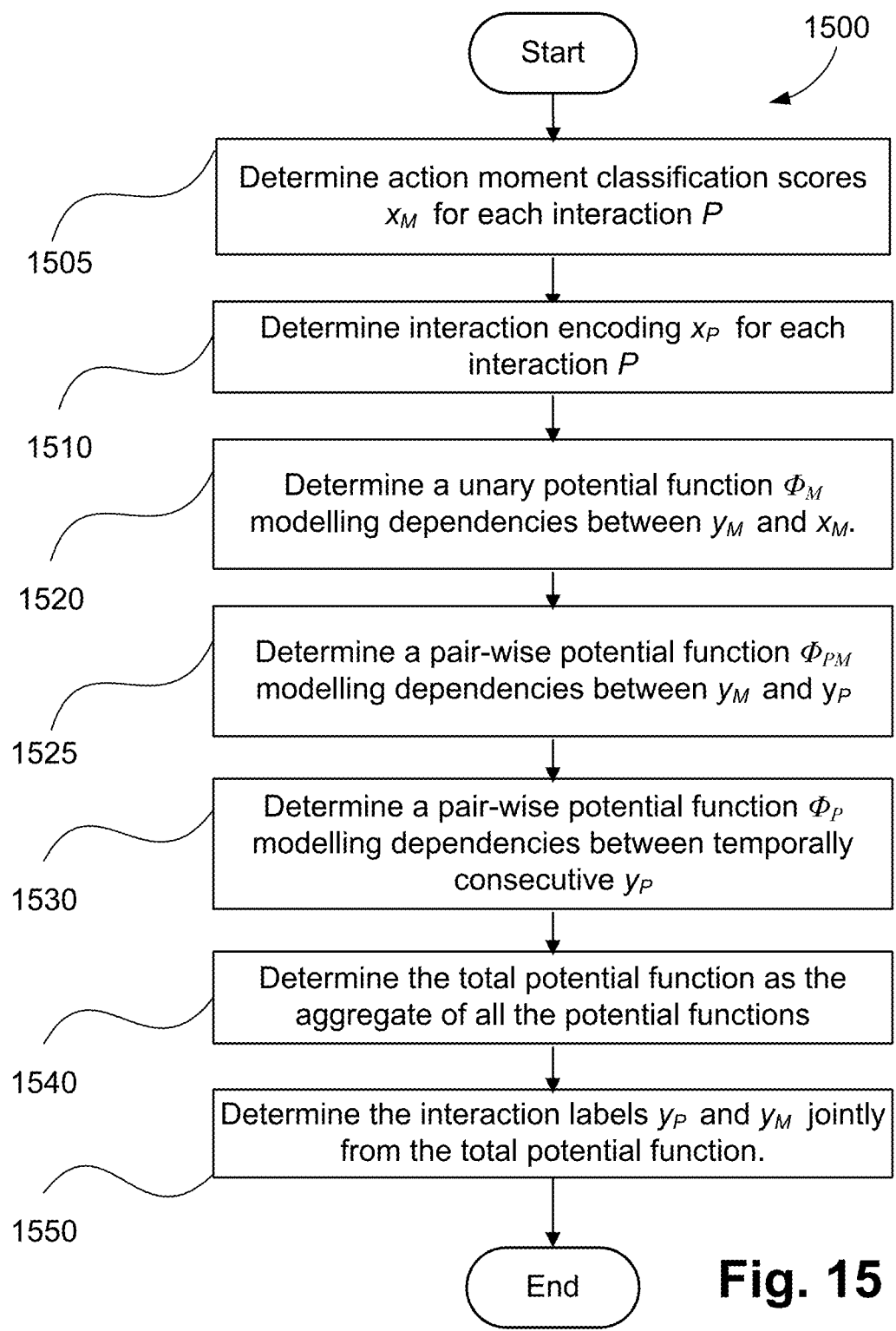
FIG. 15 is a schematic flow diagram showing a method of jointly classifying an interaction and action based on action scores and recognised roles.

FIG. 15 is a schematic flow diagram showing the method 1500 of jointly classifying actions and interactions using action moment scores and role information, using the trained CRF model 1400 of FIG. 14. The method 1500 may be implemented as one or more software code modules of the software application program 1333 resident in the hard disk drive 1310 and being controlled in its execution by the processor 1305.

For each interaction P, under execution of the processor 1305, the method 1500 determines the associated action moment classification score 735 $x_M$ at action moment classification step 1505. The associated action moment classification score 735 $x_M$ may be stored in the memory 1306. Then at interaction encoding step 1510, an interaction encoding $x_P$ is determined.

Using $x_M$, $x_P$, and the model parameters $w_P$, $w_{PM}$, $w_P$, the method 1500 determines a unary potential function $\phi_M$ modelling dependencies between $y_M$ and $x_M$, at unary potential function determination step 1520. Then at pairwise potential function determine step 1525, a pairwise potential function $\phi_{PM}$ modelling dependencies between $y_P$ and $y_M$ is determined, under execution of the processor 1305. Similarly at pairwise potential function determine step 1530, a pairwise potential function $\phi_P$ modelling dependencies between temporally consecutive $y_P$ is determined, under execution of the processor 1305.

The total potential function is determined as the aggregate of all potential function at total potential function determining step 1540. Then at interaction labels determining step 1550, the label $y_P$ for each interaction, and the label $y_M$ for each starting moment are determined jointly as the labels that maximise the total potential function. A Bayesian belief propagation algorithm may be applied to the graphical model shown in FIG. 14, at step 1550.

As the starting moment for interaction at time t is the end moment for interaction at time t−1, all the labels for the moments can be obtained at step 1560.

In an alternative arrangement, the method 1200 of classifying an interaction based on recognised actions and roles, will be executed in the interaction classification step 140. This method will now be described with reference to FIG. 12. The method 1200 is a rule based method.

The method 1200 may be implemented as one or more software code modules of the software application program 1333 resident in the hard disk drive 1310 and being controlled in its execution by the processor 1305.

The method 1200 uses the ontology associated with the target use-case, and in a rule determination step 1205 formalises a set of logical arguments which can be used to classify the interactions. Then at rule-based interaction classification step 1210, localised interactions are classified using symbolic logical inferencing. In particular, for any interaction determined in the interaction localisation step 130, at the rule-based interaction classification step 1210 logical inference is used to determine the rule which best matches the attributes of the interactions (e.g., actions of the play-agent and play-target as determined in the action classification step 740, roles of play-agent and play-target as determined in step 135; the relative time or location of the interaction, etc.). The interaction is classified as per the best matching rule generating the interaction classification 1215 as the output. The interaction attributes which are used in the rules determined in the rule determination step 1205 may include the determined roles of the play-agent and play-target as determined in the role determination step 135 and the determined action of the play-agent and play-target as determined in the action classification step 740. The interaction attributes which are used in the rules determined in the rule determination step 1205 may also include the location of the play-agent and play-target as derived from the tracks determined in people tracking step 110. If applicable, the interaction attributes which are used in the rules determined in the rule determination step 1205 may also include the location of any object of interest such as the playing ball during the interaction, as determined in the tracking step 115. A domain expert may also use other attributes relevant to the target use-case in the rule determination step 1205.

The set of rules determined in the rule-determination step 1205 is a complete set. That is, there is at least one rule which could be applied to any interaction determined in the interaction localisation step 130. One method of achieving completeness of the rule set is to have a default interaction class and a default rule with the lowest priority which is used to classify an interaction which cannot be matched to any of the other rules (with higher priority). If more than one rule is matched to a detected interaction, the rules have priority so that the rules may be prioritized at step 1210 and a best matching rule is used to classify the interaction.

An example rule which may be used in soccer or futsal automated analysis to classify an interaction as Shoot is shown below in the form of pseudo-code.

```
(
    A1 is Play-agent &
    A2 is Play-target &
    (Leg-kick(A1) | Shoot-start(A1) | Pass-start(A1)) &
        (Leg-kick (A2) | Leg-receive(A2) | Dribble-moment(A2) |
        Head-receive(A2) |
        Head-hit(A2) | Goal-keeper-receive(A2) | Goal-keeper-throw(A2))
    &
    (A1. On-team ≠ A2. On-team) &
    A2. Is-goal-keeper
) ⇒ Shoot
```

In the rule shown in pseudo-code above, words in bold represent terms from ontology with precise definition, and the two attributes of Is-goal-keeper and On-team jointly defines the four (4) roles of goalkeeper of Home team, goalkeeper of Away team, a player (other than goalkeeper) of Home team, a player (other than goalkeeper) of Away team. Specifically, the rule shown in pseudo-code above indicates that for two interacting players (previously recognised as Play-agent and Play-target in interaction localisation step 130), the interaction is classified as Shoot, if the recognised action of the Play-agent (i.e., an estimation of the action as determined using the classification method of action moment classification step 740) is one of Leg-kick or Shoot-start or Pass-start; and the recognised action of the Play-target (i.e., an estimation of the action as determined using the classification method of action moment classification step 740) is one of Leg-kick, Leg-receive, Dribble-moment, Head-receive, Head-hit, Goal-keeper-receive or Goal-keeper-throw; and Play agent and Play-target are from different teams; and the Play-target is a goalkeeper. For example, according to the rule shown in pseudo-code above, even if the action of the Play-agent is estimated as Leg-kick and the action of the Play-target is also estimated as Leg-kick, the interaction is classified as Shoot, if the Play-target is the goalkeeper of the opposite team.

Figure 16:
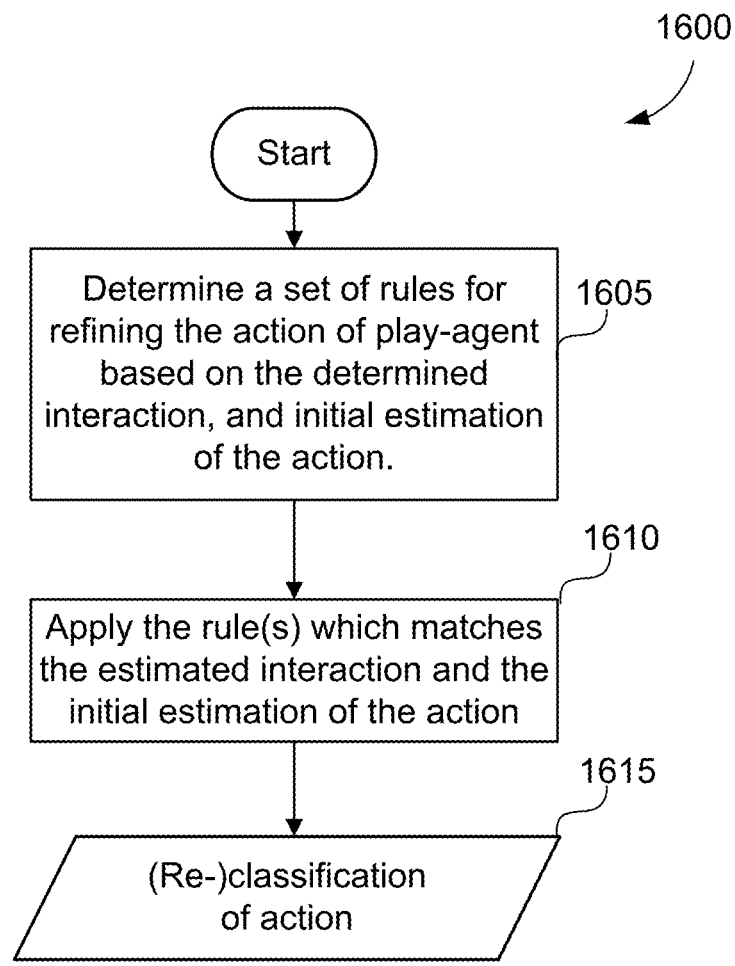
FIG. 16 is a schematic flow diagram showing a method of reclassifying actions based on recognised interactions.

Optionally, the interaction classification method 1200 may be followed by action reclassification method 1600 shown in FIG. 16, where the action labels obtained at step 740 may be refined using the interaction classifications 1215 generated using the interaction classification method 1200. The method 1600 may be implemented as one or more software code modules of the software application program 1333 resident in the hard disk drive 1310 and being controlled in its execution by the processor 1305.

The method 1600 uses the ontology associated with the target use-case, and in a rule determination step 1605 formalises a set of logical arguments which can be used to re-classify the initial estimations of the action as generated in the action classification step 740, using the classification of the interactions as determined using process 1200. For example, for soccer or futsal use-case, if an initial estimate of the action of the play-agent is 'dribble', however, the interaction classification method 1200 classifies the interaction as 'pass', the action refinement step 1610 may refine the action of play-agent as 'leg-kick'. The action refinement step may also use action moment scores 735 when reclassifying the action. For example, if an initial estimate of the action of the play-agent as generated in action classification step 740 is 'dribble', however, the interaction classification method 1200 classifies the interaction as 'shoot' and the action moment scores 735 for 'head hit' is higher than 'leg-kick', the action refinement step 1610 may refine the action of the play-agent as 'head-hit'.

It is not necessary for the set of rules determined in the rule-determination step 1605 to be a complete set (i.e., at least one rule matching every possible combination of the action and interactions). In the action refinement step 1610, if no rule can be matched to the initial estimation of the action 745 and the estimated interaction 1215, the action refinement step 1610 will proceed by using the initial estimation of the action as the final estimation.

Based on the analysis of the domain of interest and relevant ontology, corresponding interaction classification rules relevant to the other applications and use-case may be defined.

Interaction classification has a variety of applications. In one example, in the context of commercial security, the actions of people inside a shop are observed through a video surveillance system. Consider an example interaction where person A waves to person B, and then person B comes over to talk to person A. Without knowing the roles of A or B, the interaction is unclear and could be, for example, "calling for help" or "greeting a friend". However, if the role of B is known to be "security personnel" or "store staff", then the interaction may be classified as "calling for help".

In another example, the following interaction may be observed: person C gives an item to person D and person D walks out of the store with the possession of a sale item without paying at the counter. If the role of person C is a customer and the role of person D is a shop assistant (or store staff), then the interaction may be classified as "assisting a customer", but if the role of the person D is a customer, the interaction may be classified as "shop lifting" and an alarm might be raised to inform the onsite security personnel to further examine the situation.

In addition to the application in video surveillance, classifying interactions may be useful for sports analytics. In one example, the actions of players inside a futsal match are observed through a sports analytics system. Consider an example interaction where the video of such a futsal match shows player F taking control of the ball after player E kicks the ball. Without knowing the roles of player E or player F it is unclear whether the interaction is "E passes the ball to F" or "F intercepts the ball from E". However, if player E and player F are on the same team, then the interaction may be correctly interpreted to be "E passes the ball to F". Otherwise, the interaction is likely to be "F intercepts the ball from E".

The strong contextual clues provided by the roles of the people interacting in some situations enables corresponding logical rules to be formed that can greatly increase the accuracy and utility of an interaction classification system, as shown in FIG. 7. Similarly, roles such as "customer", "shop assistant", "store staff", "security personnel" and "same team player" may be recognised and used in the statistical probabilistic inferencing method of 1100.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of classifying an interaction in a sequence of video captured by a camera, the method comprising:
    detecting, by a processor, a plurality of persons in the video sequence;
    detecting and tracking a specific object to be used in actions by the plurality of persons in the video sequence;
    determining, by the processor, respective actions of the plurality of persons using features extracted from the video sequence;
    determining, by the processor, an agent person and a target person in the plurality of persons based on the respective actions and a result of tracking the specific object, where the target person is a target of an action using the specific object by the agent person and an action using the specific object by the target person is performed after the action by the agent person;
    determining, by the processor, roles of the agent person and the target person, by applying a classifier trained on an appearance to an appearance of the agent person or an appearance of the target person, or by applying a classifier trained on movements to a movement of the agent person or a movement of the target person, wherein the roles are related to functionality of a corresponding person in a group of people; and
    classifying, by the processor, an interaction between the agent person and the target person based on the determined roles of the agent person and the target person and actions which, among the plurality of respective actions, correspond to the agent person and the target person, wherein the interaction is classified in accordance with a type of plays of the agent person and the target person.

2. The method according to claim 1, wherein classification of the action of the agent person is updated based on the interaction.

3. The method according to claim 1, wherein at least one of the people is a robot.

4. The method according to claim 1, further comprising identifying other objects of interest.

5. The method according to claim 1, wherein the role of the target person is determined based on appearance features.

6. The method according to claim 1, wherein the role of the target person is determined based on movement statistics.

7. The method according to claim 1, wherein the interaction is classified based on a probabilistic graphical model.

8. The method according to claim 1, wherein the classification is a rule based classification.

9. The method according to claim 1, wherein the classification is a logic based classification.

10. The method according to claim 1, wherein the interaction is classified using tracking metadata.

11. The method according to claim 1, wherein the interaction is classified using scene characteristics.

12. The method according to claim 1, wherein the interaction is classified using moment annotation data.

13. The method according to claim 1, wherein annotation data comprises at least one of a starting frame, an ending frame, a people identifier and an action moment label.

14. The method according to claim 1, further comprising evaluating an action tube.

15. An apparatus for classifying an interaction in a sequence of video captured by a camera, the apparatus comprising:
    a memory configured to store a program; and
    at least one processor configured to execute the program stored in the memory to,
    detect a plurality of persons in the video sequence;
    detect and track a specific object to be used in actions by the plurality of persons in the video sequence;
    determine respective actions of the plurality of persons using features extracted from the video sequence;
    determine an agent person and a target person in the plurality of persons based on the respective actions and a result of tracking the specific object, where the target person is a target of an action using the specific object by the agent person and an action using the specific object by the target person is performed after the action by the agent person;
    determine roles of the agent person and the target person, by applying a classifier trained on an appearance to an appearance of the agent person or an appearance of the target person, or by applying a classifier trained on movements to a movement of the agent person or a movement of the target person, wherein the roles are related to functionality of a corresponding person in a group of people; and
    classify an interaction between the agent person and the target person based on the determined roles of the agent person and the target person and actions which, among the plurality of respective actions, correspond to the agent person and the target person, wherein the interaction is classified in accordance with a type of plays of the agent person and the target person.

16. A system for classifying an interaction in a sequence of video captured by a camera, the system comprising:
    a memory for storing data and a computer program;
    a processor coupled to the memory for executing the computer program, the program comprising instructions for:
        detecting a plurality of persons in the video sequence;
        detecting and tracking a specific object to be used in actions by the plurality of persons in the video sequence;
        determining respective actions of the plurality of persons using features extracted from the video sequence;
        determining an agent person and a target person in the plurality of persons based on the respective actions and a result of tracking the specific object, where the target person is a target of an action using the specific object by the agent person and an action using the specific object by the target person is performed after the action by the agent person;
        determining roles of for the agent person and the target person, by applying a classifier trained on an appearance to an appearance of the agent person or an appearance of the target person, or by applying a classifier trained on movements to a movement of the agent person or a movement of the target person, wherein the roles are related to functionality of a corresponding person in a group of people; and classifying an interaction between the agent person and the target person based on the determined roles of the agent person and the target person and actions which, among the plurality of respective actions, correspond to the agent person and the target person, wherein the interaction is classified in accordance with a type of plays of the agent person and the target person.

17. A non-transitory computer readable medium having a computer program stored thereon for classifying an interaction in a sequence of video captured by a camera, the program comprising:

code for detecting a plurality of persons in the video sequence;

code for detecting and tracking a specific object to be used in actions by the plurality of persons in the video sequence;

code for determining respective actions of the plurality of persons using features extracted from the video sequence;

code for determining an agent person and a target person in the plurality of persons based on the respective actions and a result of tracking the specific object, where the target person is a target of an action using the specific object by the agent person and an action using the specific object by the target person is performed after the action by the agent person;

code for determining roles of the agent person and the target person, by applying a classifier trained on an appearance to an appearance of the agent person or an appearance of the target person, or by applying a classifier trained on movements to a movement of the agent person or a movement of the target person, wherein the roles are related to functionality of a corresponding person in a group of people; and code for classifying an interaction between the agent person and the target person based on the determined roles of the agent person and the target person and actions which, among the plurality of respective actions, correspond to the agent person and the target person, wherein the interaction is classified in accordance with a type of plays of the agent person and the target person.

* * * * *